(12) United States Patent  
Sakamoto et al.

(10) Patent No.: US 6,687,453 B1  
(45) Date of Patent: Feb. 3, 2004

(54) DIGITAL IMAGE REPRODUCING APPARATUS AND METHOD

(75) Inventors: Kazuaki Sakamoto, Tokyo (JP); Masaharu Yamaguchi, Tokyo (JP); Tuneo Miyamoto, Tokyo (JP); Michio Yokozawa, Tokyo (JP); Yuushi Takehara, Tokyo (JP); Hiroki Tanaka, Tokyo (JP); Hiroshi Sunagare, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 09/275,605

(22) Filed: Mar. 24, 1999

(30) Foreign Application Priority Data

Mar. 25, 1998 (JP) .......................................... 10-096898

(51) Int. Cl.⁷ ................................................ H04N 5/91
(52) U.S. Cl. ........................... 386/46; 386/117; 386/118
(58) Field of Search ............................ 386/83, 96, 107, 386/108, 117, 46, 1, 4, 38, 39, 52, 124, 40, 118; 348/222, 207, 222.1, 207.99, 231.99; 358/909.1; H04N 5/91, 5/225, 5/76

(56) References Cited

U.S. PATENT DOCUMENTS 5,477,264 A * 12/1995 Sarbadhikari et al.

FOREIGN PATENT DOCUMENTS

| EP | 0506556 A2 * | 9/1992 |
|---|---|---|
| JP | 2-20179 | 1/1990 |
| JP | 3-201688 | 9/1991 |
| JP | 4-321390 | 11/1992 |
| JP | 4328974 | 11/1992 |
| JP | 5-56382 | 3/1993 |
| JP | 5-341924 | 12/1993 |
| JP | 6-62337 | 3/1994 |
| JP | 6-350816 | 12/1994 |
| JP | 7-23357 | 1/1995 |
| JP | 7-298191 | 11/1995 |
| JP | 8-76946 | 3/1996 |
| JP | 9-97490 | 4/1997 |
| JP | 10-51582 | 2/1998 |
| JP | 10-65948 | 3/1998 |

OTHER PUBLICATIONS

RD 363028A, Jun. 1994, Derwent Information LTD.*
Japanese Office Action issued May 24, 2000 in a related application with English translation of relevant portions.
Statement of Opposition to Patent No. 3169888 dated Nov. 28, 2001 (w/ English translation of relevant portions).
Notice of the Reason of Cancellation filed Feb. 5, 2002 (w/ English translation of relevant portions).

* cited by examiner

*Primary Examiner*—Robert Chevalier
(74) *Attorney, Agent, or Firm*—Dickstein, Shapiro, Morin & Oshinsky, LLP.

(57) ABSTRACT

A digital image reproducing apparatus which can easily reproduce image and/or sound recorded by a digital still camera is disclosed. The apparatus has an input interface for inputting image data of the digital still camera. A converter converts the image data into displayable data. The apparatus further has a display for producing a visible image based on the displayable data.

32 Claims, 17 Drawing Sheets

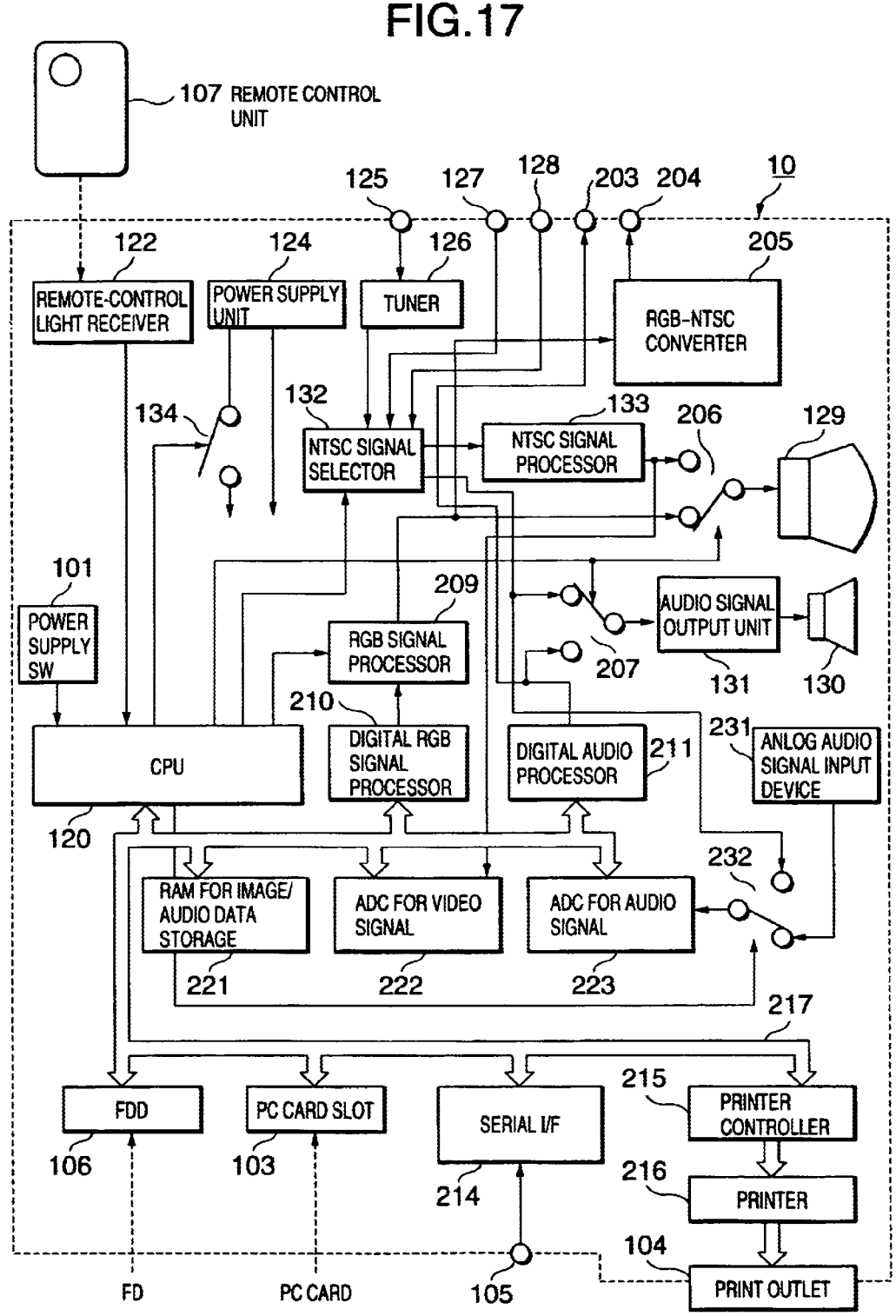

DIGITAL IMAGE REPRODUCING APPARATUS AND METHOD

BACKGROUND OF THE INVENTION

1. Field of the Invention

The present invention relates to a digital image reproducing apparatus and a method for reproducing an image picked up with a digital still camera.

2. Description of Related Art

A digital still camera is provided with an image sensor, which converts an optical image thereon into an electrical image signal. The picked-up image by the image sensor is converted into JPEG coded data or the like and the coded data is stored onto digital camera storage such as a flash memory incorporated therein. When reproduced, the camera decodes the stored data and displays the decoded image on a finder composed of a liquid crystal display (LCD). A digital still camera may be provided with a driver for an external storage medium like a floppy disk (FD), a compact FD, a PC card mounted with a flash memory, a compact flash memory card, or the like. In this case, the coded data of a picked-up image is stored onto the external storage medium. The digital still camera can also be equipped with a serial interface, which is used to output the stored coded data to the outside. Some of the digital still cameras are further equipped with a video output terminal and an audio output terminal and can output the stored data as a video signal and an audio signal.

Since the LCD finder of a digital still camera is small, it is necessary to transfer the image data to external equipment having a large-screen display device to make a large screen display of the picked-up image. Further, for making a print output, the image data needs to be transferred to external equipment having a printer.

FIG. 1 shows a general configuration for reproduction of image data or audio data stored in the digital still camera by using a personal computer. A digital still camera 100 is composed of a camera housing 108 which is provided with a video output terminal 109 to be connected with a television set, an audio output terminal 110 to be connected with the television set or the like, a serial data terminal 111 for digital video data and digital audio data, and a PC card slot 112 for writing digital video data onto a PC card or the like mounted with a storage medium such as a flash memory.

A personal computer 400 has a serial data terminal 401 capable of inputting digital video data and digital audio data, or a PC card slot 402 for writing data to or reading data from a PC card including the flash memory or the like. To the personal computer 400, there are also connected a monitor 404 using a CRT, a LCD or the like. Further, there are also connected a printer 405 through a printer cable 406, a keyboard 407 and a pointing device 408.

In such a system, a user turns on power-supply switches of the personal computer 400, the monitor 404 and the printer 405, respectively, and waits for a start up of an operating system (OS) of the personal computer 400. In the case where the image data of the digital still camera 100 is transferred to the computer 400 using the PC card or the like, the PC card storing the image data is inserted into the PC card slot 402 in the operating state where the OS is normally running on the CPU. In the case of transferring the image data of the digital still camera 100 through the serial interface, the serial data terminal 111 of the digital still camera 100 is connected to the serial data terminal 401 of the personal computer 400 through the serial data cable. Then, the digital still camera 100 is turned on and thereby the image data is transferred from the digital still camera 100 through the serial data cable to the computer 400 and the transferred image data is stored onto the hard disk or the like of the personal computer 400.

After the image data has been transferred to the personal computer 400, the user inputs a command through the keyboard 407 or the mouse 408 so that a digital image reproducing program is started. Further, the user inputs the directory of an image data file storing the image data and then the digital image reproducing program starts reproducing the original image from the image data of the image data file to display it on the monitor 404. If there is an audio data file associated with the image data file, the audio data file is also read out to reproduce an audio signal at the same time when the image data file is read out.

When the user wants to make a print out of the image on a paper or the like, the user clicks a print button on the screen display with the mouse 408 and thereby the displayed image data is output to the printer 405, which then produces hard copy output.

FIG. 2 shows another system configuration for reproducing image or sound stored in the digital still camera 100. The video output terminal 109 of the digital still camera 100 is connected with a video input terminal 506 of a television set 501 through a cable 503, and the audio output terminal 110 of the digital still camera 100 is connected with an audio input terminal 507 of the television set 501 through a cable 502. Further, a video image output terminal 508 of the television set 501 is connected with a video signal input terminal 509 of a video printer 505 through a cable 504. A remote control unit 510 transmits a control signal to the television set 501 by infrared ray, for example.

In such a system, when the power supply cord of the television set 501 has been inserted into a wall outlet, power is supplied to necessary circuit components including a CPU and a remote-control receiver circuit. In this state, the power supply switch remains in the off position and therefore power is not supplied to television receiver circuits including a tuner, an NTSC signal processor, and a cathode-ray tube (CRT). When the power-supply switch has been turned on manually or by the remote control unit, the power is supplied to the tuner, the NTSC signal processor, the CRT and other necessary circuits.

If the user wants to reproduce an image picked up by the digital still camera 100, the user operates the remote control unit 510 to change an input directory from the tuner to the video input terminal 506 and the audio input terminal 507 connected to the digital still camera 100. Accordingly, the video signal and the audio signal of the digital still camera 100 are transferred to the television set 501. The image picked up by the digital still camera 100 is reproduced and displayed on the CRT, and the sound recorded in the digital still camera 100 is output from a speaker.

In Japanese Patent Application Laid-open Publication No. 4-328974, there is disclosed a portable still image filing apparatus which is equipped with the input terminal for video and audio signals and an interface to an external storage unit, and further equipped with an interface to a personal computer and the signal output terminal used to be connected to an external monitor device. The monitor device can be incorporated in this filing apparatus.

According to the conventional still image filing apparatus, the respective image and audio data input from the video signal and audio signal input terminals can be reproduced by the monitor device. The image data and audio data can also be processed by the externally connected personal computer. Further, information can be input to and output from the external storage unit through the interface to the external storage unit.

As image and sound recorded by the digital still camera have been reproduced in the manner as described above, there are developed following disadvantages.

1) In the case of reproduction of image and sound through the serial interface or the external storage medium such as a PC card or the like, it is necessary to prepare the personal computer 400 equipped with a serial interface port or an interface for the external storage medium, such as a PC card slot 402. The user must wait for start-up of the OS of the personal computer 400, and after the startup of the OS, the user must start the image and sound reproduction program and further specify the directory of the image and audio data file by using the keyboard 407 and the mouse 408.

In general, at the time of starting up the OS of the personal computer 400, it takes time until the startup of the OS is completed. The reason is that the OS performs a check procedure of the keyboard 407, the mouse 408 and other peripheral components before the completion of the start up of the OS. Further, since the application program request user's operations, it takes more time before the image and sound become ready for reproduction. In other words, if the image and sound of the digital still camera 100 are to be reproduced using the personal computer 400, it takes time until the reproduction becomes ready for starting after the personal computer 400 has been started. Such an operation causes the user to be kept waiting, resulting in irritated user.

It is also necessary to secure a place for setting the personal computer 400 and the monitor 404. Further, if the personal computer 400 is not available at home, it is not possible to reproduce the image and sound of the digital still camera 100.

2) If the personal computer 400 is not available at home, it is necessary to reproduce the image and sound of the digital still camera 100 by using a video reproducing device such as the television set 501 or the like. In this case, the user must at first connect the video output terminal 109 and the audio output terminal 110 of the digital still camera 100 to the video input terminal 506 and the audio input terminal 507 of the television set 501 through cables 502 and 503, respectively. Next, the user must turn on the television set 501 and the digital still camera 100, and then must set the television 501 so that the signal input port is changed to the video input terminal 506 and the audio input terminal 507 using the remote control unit 510 before reproducing the image and audio.

In general, a television set is not designed to be connected to the digital still camera 100. Therefore, in the case of using the television set 510 as an image reproducing unit, the user needs to select a video reproducing mode by operating a television/video change-over key on the remote control unit 510. However, a user who is not aware of this selective processing cannot carry out the reproduction of the image and sound transferred from the digital still camera 100.

3) In the case where the printer 405 produces the hardcopy output of an image transferred from the digital still camera 100 using the personal computer 400, it is further necessary to turn on the printer 405 and to click the print button displayed on screen by the application program. Accordingly, it is also necessary to secure a place for setting the printer 405, which further requires wiring arrangement and mouse operation for executing the printing. This is cumbersome to the user. If the personal computer 400 is not available at home, it is not possible to carry out the printing.

4) In the case where the video reproducing equipment such as the television set 501 produces the hardcopy output of an image transferred from the digital still camera 100, it is necessary to prepare the video printer 505. In this case, the user must at first connect the video output terminal 109 of the digital still camera 100 to the video input terminal 506 of the television set 501 through the cable 503. Then, the user must connect the video output terminal 508 of the television set 501 to the video signal input terminal 509 of the video printer 505 through the cable 504. In the case of connecting the video output terminal 109 of the digital still camera 100 to the video signal input terminal 509 of the video printer 505 for direct printing, it is necessary to connect the video input terminal 506 of the television printer 505 to the video input terminal 506 of the television set 501 for confirming the image to be printed. The user then turns on the television set 501, the digital still camera 100 and the video printer 505. Then, the user operates the digital still camera 100 to select a target image by confirming the image on the display of the television set 501, and has the image printed out by the video printer 505.

As explained above, when the image of the digital still camera 100 is to be printed out by using the television set 501 or the like, the wiring becomes complex and it also requires a considerable work for making hardcopy output of the image. Further, since the video printer 505 is expensive, this is not prepared at home in most cases.

5) The data of an image picked up by the digital still camera 100 is stored in a flash memory accommodated in the camera or in an external storage medium such as a PC card or the like. In general, after this image has been reproduced, the image is erased for the next image pick-up. In the case of reproducing the image using the personal computer 400, the image data can be stored in the hard disk or the like of the personal computer 400. However, in the case of reproducing the image by using the television set 501 or the like, there is no means available for storing the image data. In other words, under the circumstance of unavailability of the personal computer 400, it is difficult to store the image picked up by the digital still camera 100.

6) The still image filing apparatus disclosed in Japanese Patent Application Laid-open Publication No. 4-328974 has an object of portability as clearly described in the disclosure. Therefore, only a relative small-sized monitor device can be incorporated. Accordingly, although this has a monitoring function, it is still necessary to connect this apparatus to an external monitor device or a personal computer in order to make the reproduction of a larger-screen image. Further, because of the portable type, it is difficult to incorporate a printer in this apparatus, and it is necessary to connect a video printer or the like to this apparatus to produce hardcopy output of the image data. In other words, this conventional apparatus disclosed in the above publication cannot make by itself an effective reproduction or print output of the image data input from the digital still camera.

SUMMARY OF THE INVENTION

It is an object of the present invention to provide a digital image reproducing apparatus and method, which can easily reproduce image and/or sound recorded by a digital still camera.

According to the present invention, digital image reproducing apparatus reproduces at least an image picked up by a digital still camera. The apparatus includes an input interface for inputting recorded data of the digital still camera, the recorded data including at least image data; a converter for converting the recorded data into reproduced data; and a user interface for producing a recognizable output based on the reproduced data. The user interface may be a display, a speaker, and/or a printer.

Further, the apparatus includes a power supply; a data medium connectable to the input interface, wherein the data medium is used to provide the recorded data to the input interface; and a controller controlling the input interface, the converter, the user interface, and the power supply. The data medium may be a PC card, a floppy disk, or a serial interface.

Preferably, when the power supply is turned on, the input interface may input the recorded data from the data medium and the converter is activated to convert the recorded data to the reproduced data under control of the controller. Alternatively, when the data medium is connected to the input interface, the power supply may be turns on and the converter is activated to convert the recorded data to the reproduced data under control of the controller.

BRIEF DESCRIPTION OF THE DRAWINGS

FIG. 17 is a block diagram showing the internal circuit of a digital image reproducing apparatus according to a seventh embodiment of the present invention;

DETAILED DESCRIPTION OF THE PREFERRED EMBODIMENTS

Figure 1:
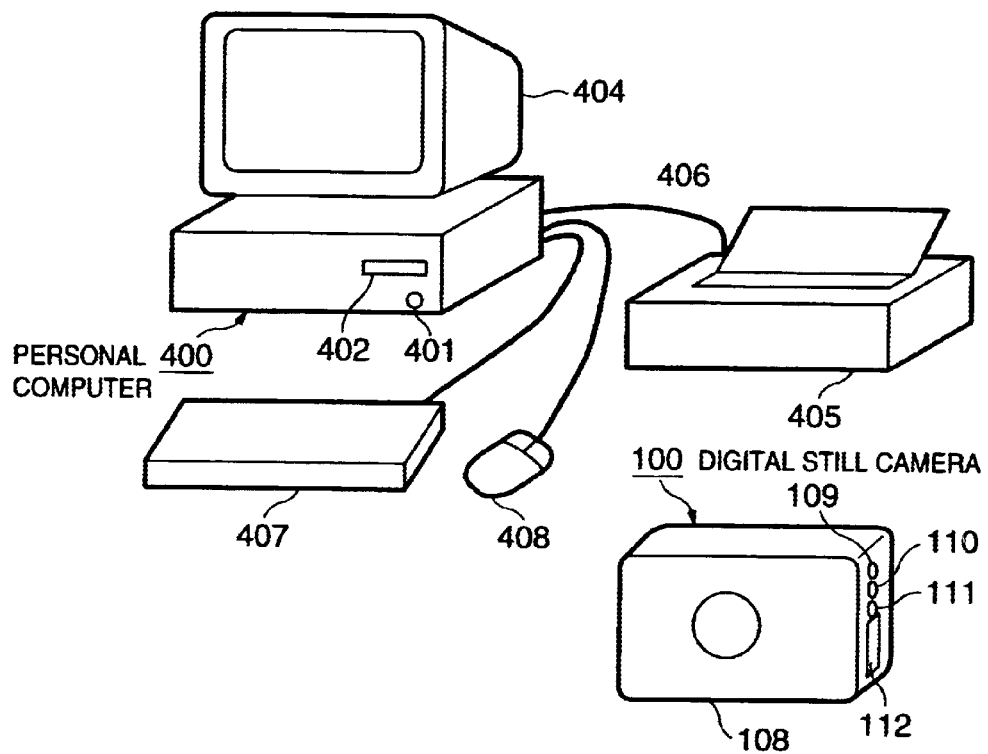
FIG. 1 is a schematic diagram showing a conventional configuration for reproduction of image and/or sound stored in the digital still camera by using a personal computer.

As shown in FIG. 1, a system is composed of a digital image reproducing apparatus 10, a digital still camera 100, and a remote control unit 107. The digital still camera 100 may be the conventional one as shown in FIG. 1. The remote control unit 107 is a well-known remote control used to control the digital image reproducing apparatus 10.

The digital image reproducing apparatus 10 is provided with a power-supply switch 101, a light receiving window 102 for receiving remote control light signals from the remote control unit 107, a PC card slot unit 103 used to read and write data from and to a PC card, an print outlet 104 for ejecting a sheet of paper from a printer unit, a serial data terminal 105 to which a serial interface cable is connected, and a floppy disk drive unit (FDD unit) 106 for reading and writing data from and to an FD.

FIRST EMBODIMENT

Figure 4:
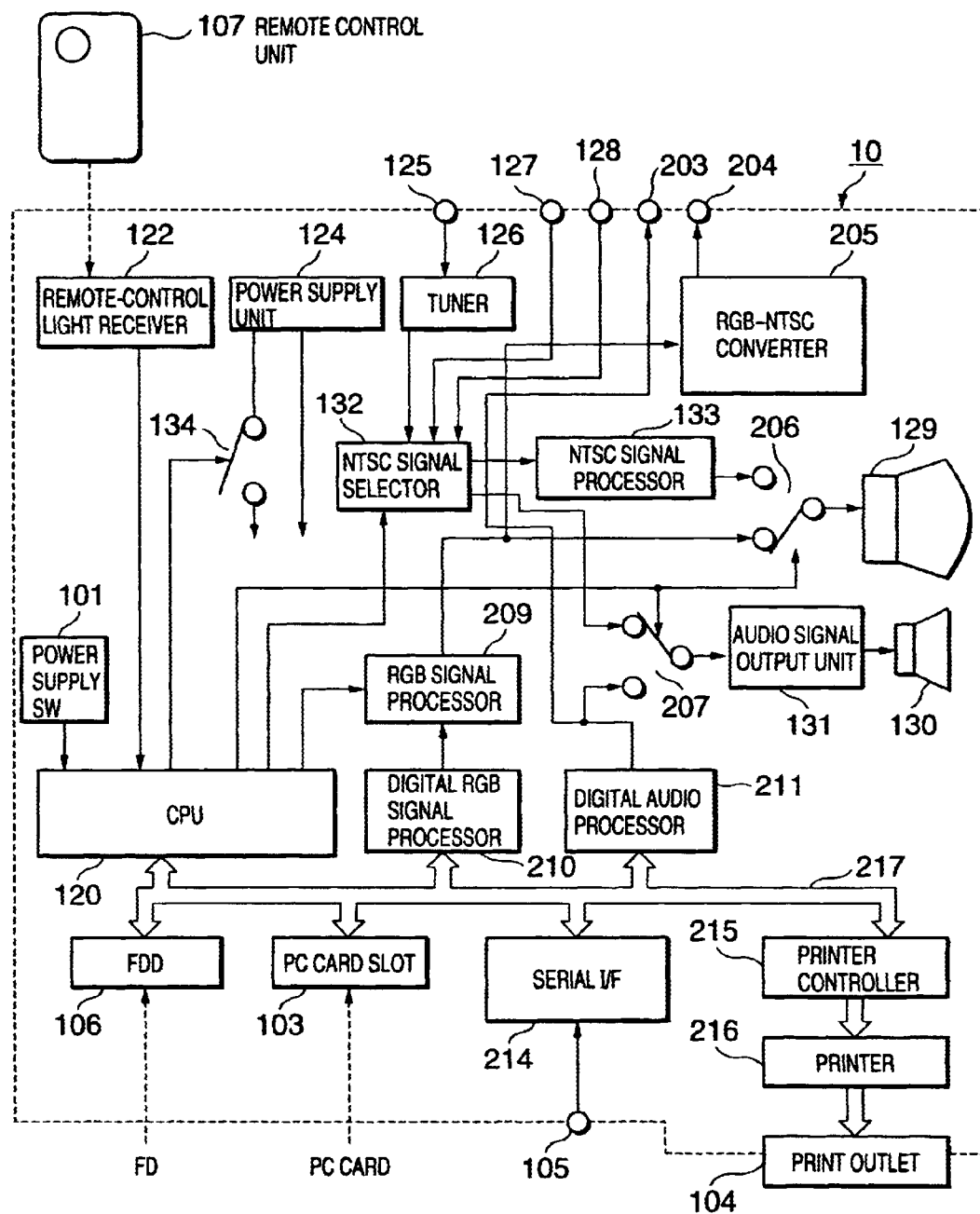
FIG. 4 is a block diagram showing the internal circuit of a digital image reproducing apparatus according to a first embodiment of the present invention.

Referring to FIG. 4, a digital image reproducing apparatus 10 is provided with a remote-control light receiver 122 for receiving signal light from the remote control unit 107 through the window 101. Remote control signals produced by a user operating the remote control unit 107 are transferred to a processor (CPU) 120 through a remote-control light receiver 122. A tuner 126, which is a television signal receiver, is connected to an antenna input terminal 125. The tuner 126 outputs a video and audio signals included in the received television signal (here, NTSC signal) to an NTSC signal selector 132. The NTSC signal selector 132 inputs a video signal and an audio signal from external equipment through a video signal input terminal 127 and an audio signal input terminal 128, respectively.

The NTSC signal selector 132 selects one of the video signal input from the external equipment and the video signal input from the tuner 126 and outputs the selected video signal to an NTSC signal processor 133. Further, the NTSC signal selector 132 selects one of the audio signal input from the external equipment and the audio signal input from the tuner 126 and outputs the selected audio signal to an audio signal selector 207. The NTSC signal processor 133 adjusts the selected video signal and outputs the adjusted video signal to a video signal selector 206.

The CPU 120 having ROM and RAM (not shown) therein is connected to the PC card slot unit 103, the FDD 106, a digital RGB signal processor 210, a digital audio signal processor 211, a serial interface 214, and a printer controller 215 through a bus line 217. The digital RGB signal processor 210 generates a digital RCB signal by adding a horizontal synchronizing signal and a vertical synchronizing signal to input digital video data. The digital audio signal processor 211 converts the input digital audio data into an analog audio signal. The serial interface 214 is connected to the serial data terminal 105 to carry out a serial-to-parallel conversion. The printer controller 215 converts image data into print output data. The digital image reproducing apparatus 10 is further composed of a printer 216 which makes a print on a sheet of paper depending on the print-output data input from the printer controller 215. The printed paper is ejected from the print outlet 104.

In the case where the power supply cord of the apparatus 10 is plugged into the wall outlet, for example, the CPU 120 monitors the state of a power-supply switch 101 which would be turned on/off by the user. Depending on the on/off state of the power-supply switch 101, the CPU 120 controls a switch 134 connecting a power supply unit 124 to the circuit blocks other than predetermined circuit blocks in the apparatus 10. In a state that the switch 134 is open, power is supplied from the power supply unit 124 to only the predetermined circuit blocks: the CPU 120, the remote-control light receiver 122, the power-supply switch 101, the PC card slot unit 103, the FDD 106, and the serial interface unit 214. When the switch 134 is closed, power is supplied to the other circuit blocks as well.

A digital RCB signal outputted from the digital RGB signal processor 210 is converted to an analog RGB signal by an RGB signal processor 209, and the analog RGB signal is output to the video signal selector 206. The video signal selector 206 selects one of the video signal from the NTSC signal processor 133 and the analog RGB signal from the RGB signal processor 209 and outputs a selected one to the display 129 such as CRT or LCD. The analog RGB signal from the RGB signal processor 209 is converted into a video signal by an RGB-NTSC converter 205, and the video signal is output to a video output terminal 204.

An audio signal selector 207 selects one of an audio signal from the NTSC signal selector 132 and an audio signal from the digital audio signal processor 211 and outputs a selected on to an audio signal output unit 131. The audio signal output unit 131 outputs the input audio signal to a speaker 130. The audio signal from the digital audio signal processor 211 is also output to an audio signal output terminal 203.

Figure 5:
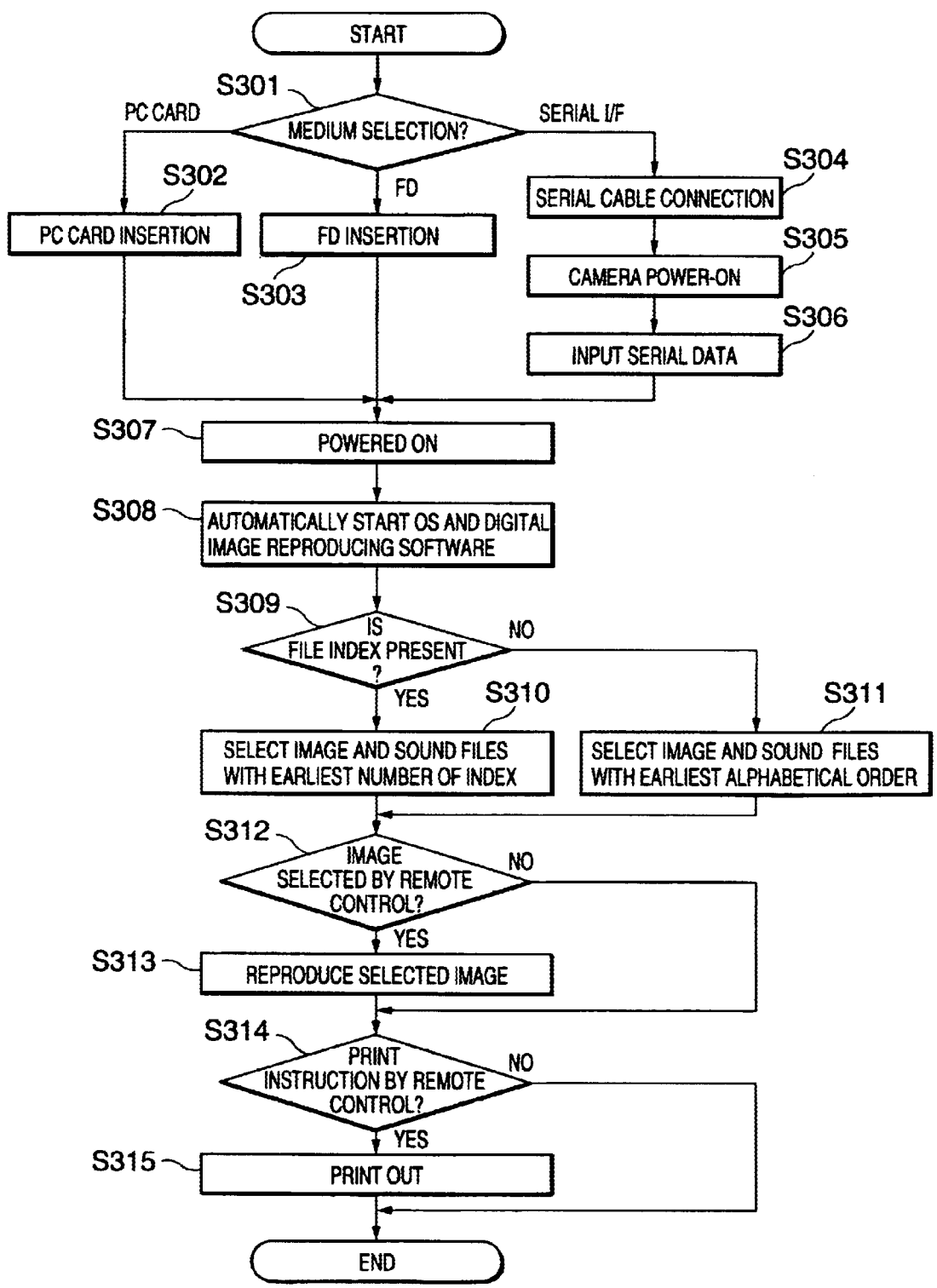
FIG. 5 is a flowchart showing an operation of the first embodiment.

Referring to FIG. 5, as described before, when the user has inserted the power supply cord of the digital image reproducing apparatus 10 to the wall outlet, power is supplied to the CPU 120, the remote-control light receiver 122, the power-supply switch 101, the PC card slot unit 103, the FDD 106 and the serial interface unit 214. In the present embodiment, the reproduction of image and/or sound is started automatically when either a PC card or an FD has been inserted into the digital image reproducing apparatus 10 or when there has been an input of serial data through the serial interface unit 214.

In the case where the PC card has been inserted (steps S301 and S302), a mechanical switch (not shown) equipped in the PC card slot unit 103 detects the card insertion and the PC card slot unit 103 informs the CPU 120 of the insertion of the PC card. Then, the CPU 120 turns on the switch 134, so that power is supplied to all the blocks within the apparatus 10 (step S307).

In the case where the FD has been inserted (steps S301 and S303), a mechanical switch (not shown) equipped in the FDD unit 106 detects the insertion of the FD. The FDD unit 106 informs the CPU 120 of the insertion of the FD. In this case, the CPU 120 also turns on the switch 134 so that power is supplied to all the blocks within the apparatus 10 (step S307).

On the other hand, in the case of the serial interface used, the serial cable connected to the serial data terminal 111 of the digital still camera 100 is inserted into the serial data terminal 105 (step S304). Then, the power supply to the digital still camera 100 is turned on (step S305), and the serial interface unit 214 starts the input of the serial data (step S306). Then, the serial interface unit 214 informs the CPU 120 that the serial data input is started. In this case, the CPU 120 also turns on the switch 134 so that power is supplied to all the blocks within the apparatus 10 (step S307).

Thereafter, the CPU 120 automatically starts the OS stored in the ROM, and further starts the digital image reproducing program (step S308). The CPU 120 then changes over the video signal selector 206 to select the analog RGB signal from the RGB signal processor 209. Further, the CPU 120 changes over the audio signal selector 207 to select the audio signal from the digital audio signal processor 211.

In the case where the video data and audio data have been stored in the external storage medium such as the PC card or the FD, the CPU 120 checks whether a file index representing a sequential order of files is included in the medium (step S309). When the file index is included (YES in step S309), an image data file and an audio data file with the earliest number are selected (step S310). If such an index is not included (NO in step S309), an image data file and an audio data file with the earliest alphabetical order are selected (step S311). If the audio data file is associated with the image data file in the storage medium, these files are selected as associated files.

Image data and audio data received from the digital still camera 100 through the PC card, the FD or the serial interface are compressed. Accordingly, the CPU 120 decodes the input data and expands them into the RAM (not shown). The decoded image data is transferred to the digital RGB signal processor 210. The digital RGB signal processor 210 adds a horizontal synchronizing signal and a vertical synchronizing signal to the transferred digital image data to generate a digital RGB signal. The digital RGB signal is output to the RGB signal processor 209. The RGB signal processor 209 converts the digital RGB signal into an analog RGB signal, and outputs it to the video signal selector 206. Since the video signal selector 206 has been changed to select the analog RGB signal from the RGB signal processor 209, the original image picked up by the digital still camera 100 is displayed on the display 129 based on the analog RGB signal from the RGB signal processor 209.

If there exists an audio data file associated with an image data file, the CPU 120 transfers the audio data of the audio data file to the digital audio signal processor 211. The digital audio signal processor 211 converts the audio data into an analog audio signal, and output this signal to the audio signal selector 207. The audio signal selector 207 transfers the audio signal from the digital audio signal processor 211 to the audio signal output unit 131.

If the displayed image on screen is not a desired one, the user operates the remote control unit 107 to select another image (step S312). Then, the CPU 120 decodes the image data of the selected file stored in the external storage medium to expand them on the RAM. And the expanded image data is transferred to the digital RGB signal processor 210 to be displayed on screen (step S313). If there exists an audio data file associated with the selected image data file, the CPU 120 transfers the audio data of the associated audio data file to the digital audio signal processor 211. The user can operate by remote control to make the desired image displayed on the display 129, and can make the associated audio sound generated from the speaker.

Although the user selects the desired file as described above, a plurality of images may be sequentially reproduced and displayed by the remote control until a user's desired image is displayed on screen. It may also be structured such that a predetermined number (for example, eight) of reduced images are displayed on screen, and an image selected by the user operating the remote control unit 107 is displayed on full screen.

When the user wants a displayed image to be printed, the user sends a print command to the apparatus 10 by the remote control unit 107. Then, the CPU 120 receives this command through the remote-control light receiver 122 (YES in step S314). Then, the CPU 120 transfers the expanded image data stored in the RAM to the printer controller 215. The printer controller 215 converts the image data into printable form and outputs the data to the printer 216. Based on the input data, the printer 216 produces hardcopy output, and ejects the printed paper from the print outlet 104 (step S315).

According to the first embodiment, since the RCB-NTSC converter 205 converts the analog RGB signal from the RGB signal processor 209 into an image signal of the NTSC and outputs this signal to the video output terminal 204, it is also possible to make a print output by the video printer connected with cable to the video output terminal 204.

For making an input of image data from the serial interface unit 214, the CPU 120 carries out decoding of the input image data and transfers the decoded data to the digital RGB signal processor 210, in a similar manner as described above.

If the user wants to watch the television, the user presses the television key on the remote control unit 107. The CPU 120 is informed through the remote-control light receiver 122 that the television key has been pressed. Then, the CPU 120 changes over the video signal selector 206 to select the video signal from the NTSC signal processor 133. Further, the CPU 120 changes over the audio signal selector 207 to select the audio signal from the NTSC signal selector 132. Then, pictures based on the video signal from the tuner 126 are reproduced and displayed on the display 129. Also, sounds based on the video signal are output from the speaker 130. The tuner 126 reproduces a video signal of a channel selected by the user operating the remote control unit 107.

Figure 2:
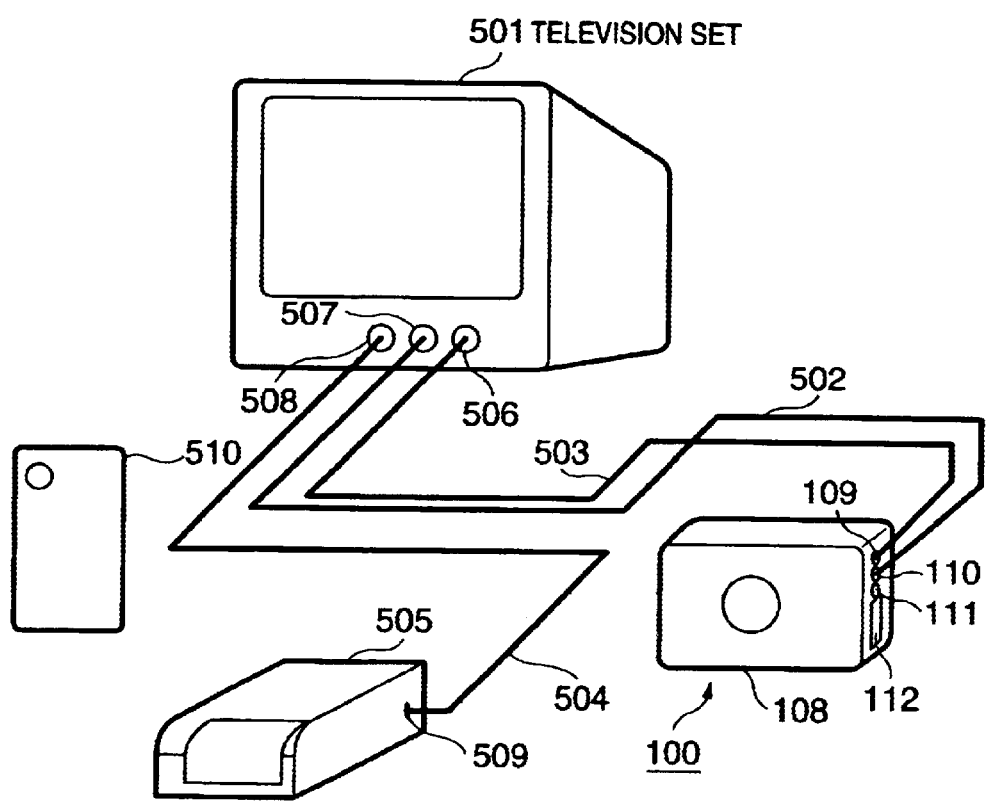
FIG. 2 is a schematic diagram showing another conventional system configuration for reproducing image and/or sound stored in the digital still camera by using a television set.
Figure 3:
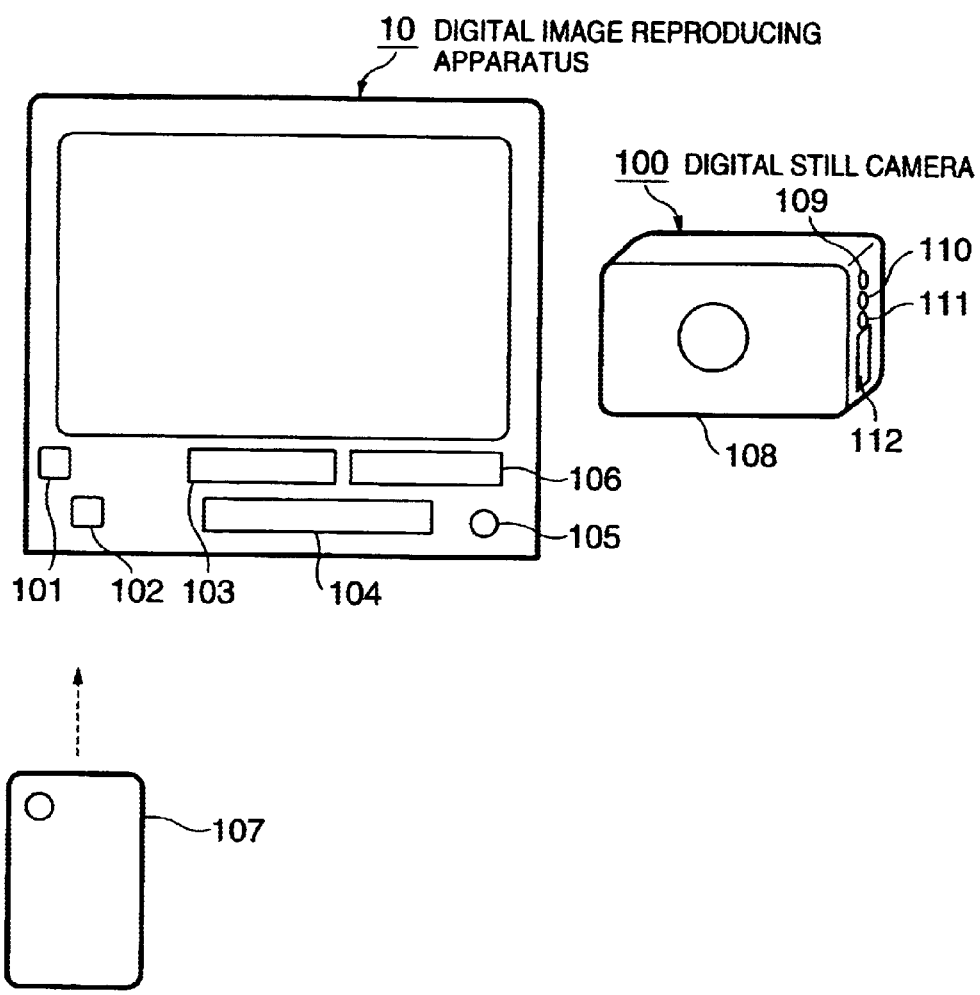
FIG. 3 is a schematic diagram showing one example of a system configuration using a digital image reproducing apparatus according to the present invention.

As described above, according to the first embodiment, the digital image reproducing apparatus 10 is equipped with the PC card slot unit 103 for inputting image data and audio data, the FDD 106 and the serial interface unit 214, in addition to the television receiving function. Therefore, if this digital image reproducing apparatus 10 is installed in stead of the conventional television set 501, it becomes possible to make reproduction of images and/or sounds of the digital still camera 100 without practically increasing the installation area. Further, if the digital image reproducing apparatus 10 has the printing function, it is possible to print out images of the digital still camera 100 without a personal computer or a video printer, as shown in FIGS. 1 and 2.

Furthermore, according to this digital image processing apparatus 10, a complex wiring is not required for carrying out reproduction and printing of images. Thus, the apparatus can be used easily by ordinary users.

Still furthermore, since the reproduction and the printing of an image are carried out automatically by only the remote control operation, it is easy to carry out the reproduction and the printing of an image recorded by the digital still camera 100.

According to the digital image reproducing apparatus 10, the OS and the application software stored in the ROM and RAM are started automatically when the power supply to the whole apparatus is turned on. Accordingly, the reproduction of an image can be started in about five seconds, for example, although there may be some difference depending on the performance of the CPU 120. The digital image reproducing apparatus 10 according to the present invention makes the automatic startup from the ROM possible. It has been impossible to do so according to the conventional system using the television set 501 or the like. Further, according to the conventional system using the personal computer 400, various application programs are generally used therein. Therefore, it has been inconvenient to automatically start up the digital image reproducing software at the time when the power is supplied to the computer.

In the first embodiment, when the PC card or the FD has been inserted into the digital image reproducing unit 10 or when there has been input of serial data, power is supplied automatically and the reproduction of image and/or sound can be started automatically. However, the apparatus can also be structured such that when power has been turned on by the user, the OS and the application program are started, and thereafter, the reproduction of image and/or sound is started automatically either when the PC card or the FD has been inserted into the digital image reproducing apparatus 10 or when there has been input of serial data.

SECOND EMBODIMENT

In the first embodiment described above, the reproduction of an image is automatically performed when an external storage medium is inserted or when data has been input through the serial interface. Alternatively, a menu-driven software may be used to reproduce and print an image picked up by the digital still camera 100.

The second embodiment using the menu-driven software will be described in detail hereinafter with reference to FIGS. 6 and 7A–7F. The circuit configuration of the digital image reproducing apparatus implementing the second embodiment may be the same as that shown in FIG. 4. In other words, the program stored in the ROM of the CPU 120 is changed to the menu-driven software according the second embodiment.

Figure 6:
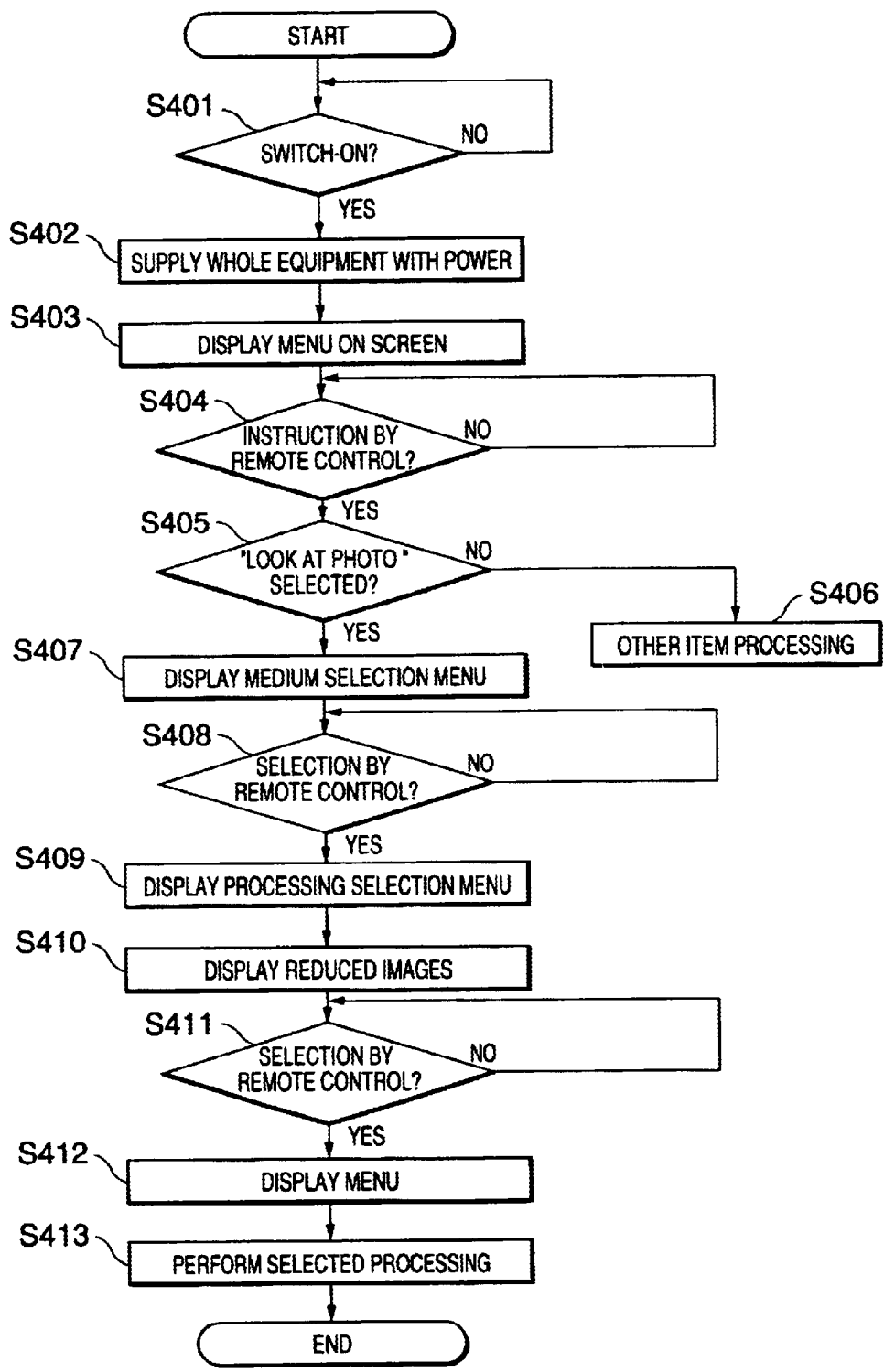
FIG. 6 is a flowchart showing an operation of a digital image reproducing apparatus according to a second embodiment of the present invention.

Referring to FIG. 6, when the power-supply switch 101 has been turned on or when there has been dispatched a command for turning on the power supply from the remote control unit 107 (YES in step S401), the CPU 120 turns on the switch 134 and thereby power is supplied to the whole apparatus (step S402). Then, the CPU 120 starts up the digital image reproducing program according to the second embodiment.

Figure 7A:
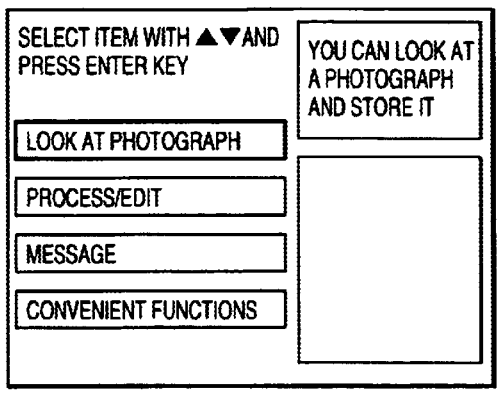
FIGS. 7A–7F are an explanatory diagram for showing a menu screen in the second embodiment.

First, a menu is displayed on screen as shown in FIG. 7A on the display 129 (step S403). More specifically, the CPU 120 changes over the video signal selector 206 to select an analog RGB signal from the RGB signal processor 209, and outputs menu screen data stored in the ROM to the digital RCB signal processor 210.

Here, it is assumed that the user can select by the remote control unit 107 items of "Look at photograph", "Process/edit", "Message" and "Convenient function". "Look at photograph" is a processing item for displaying an image input from the external storage medium or through the serial interface. "Process/edit" is a processing item for editing an image stored in the external storage medium or the like. "Message" is a processing item for setting or reproducing a message (including image and/or voice). "Convenient functions" is a processing item for formatting an FD, for example.

When the user moves a cursor (a highlighted frame in the example of FIGS. 7A–7F) to select a desired processing item with a predetermined key on the remote control unit 107 and presses the enter key, the processing indicated by the cursor is started.

Here, the reproduction of an image of the digital still camera 100 will be described. Accordingly, if the user has selected a processing item other than "Look at photograph" by the remote control operation, the other processing is carried out (YES in step S404, NO in step S405 and S406).

Figure 7B:
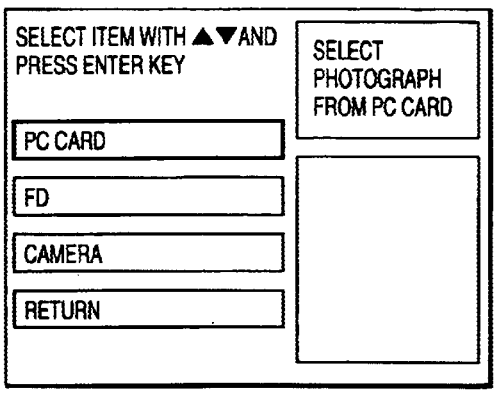

When "Look at photograph" has been selected by remote control operation (YES in step S405), the CPU 120 controls the RGB signal processor 209 so that a medium selection menu is displayed on screen as shown in FIG. 7B (step S407). When the user has pressed the enter key of the remote control unit 107 with the cursor pointing to a desired medium, the CPU 120 displays a processing selection menu on screen as shown in FIG. 7C (YES in step S408 and S409).

Figure 7C:
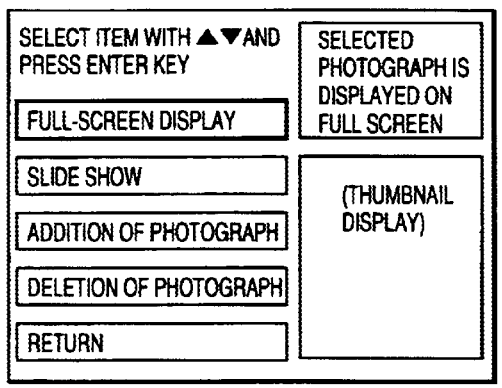

In the processing selection menu as shown in FIG. 7C, a plurality of images in each image data file included in the selected external storage medium are displayed in reduced form in the thumbnail-display window (step S410). The images in the image data file are displayed on screen in a manner similar to that of the first embodiment. Then, the user can select any one of the images by remote control operation (step S411).

In the processing selection menu displayed on screen as shown in FIG. 7C, when an item has been selected by remote control operation (step S411), a menu screen of the corresponding processing is displayed (step S412), and this processing is carried out (step S413). There is also a case where the menu screen is not displayed and the corresponding processing is carried out immediately.

Figure 7D:
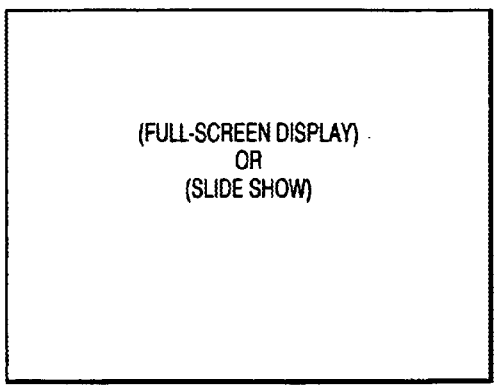
Figure 7E:
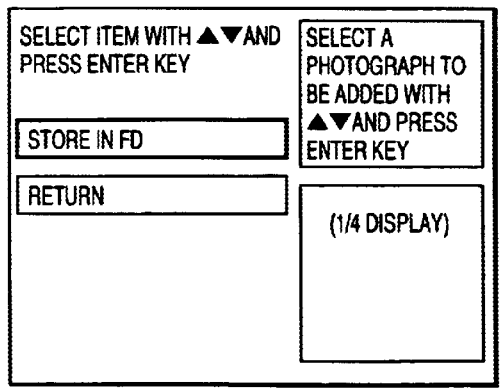
Figure 7F:
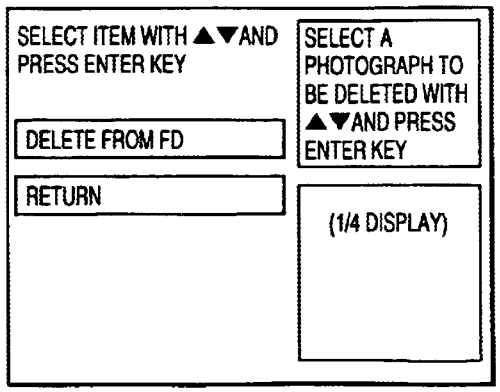

In the processing selection menu displayed on screen as shown in FIG. 7C, for example, when "Full screen display" is selected, the CPU 120 changes the selected image into full-screen display as shown in FIG. 7D. In the case where "Slide show" has been selected, the CPU 120 carries out the processing for sequentially reproducing images in each image data file of the external storage medium to makes a sequential display of the images on screen. When "Addition of photograph" has been selected, a menu is displayed on screen as shown in FIG. 7E, and makes a file of the selected image to write it onto the FD or the like. "Addition of photograph" is a processing item for taking in an image from the digital still camera 100, for example, through the serial interface and then storing the input image on the FD. When "Deletion of photograph" has been selected, a menu is displayed on screen as shown in FIG. 7F, and the file of a selected image is deleted from the FD or the like.

Although "Addition of photograph" and "Deletion of photograph" are carried out for the FD in the above, these processing items can also be carried out for other external storage mediums.

As explained above, in the second embodiment, the menu screen is displayed when power has been turned on. Thus, the user can select a desired item by remote control operation and can make desired processing to be carried out. Therefore, the user interface is more simplified and friendly.

For printing an image, the user selects an image in the menu screen as shown in FIG. 7C and presses a print key on the remote control unit 107. Then, the CPU 120 transfers the data of the selected image to the printer controller 215.

When "Return" is selected on each menu screen, the display returns to the screen one before and the processing returns to one step before. This is omitted from the flowchart in FIG. 6.

THIRD EMBODIMENT

The third embodiment using menu driven software will be described in detail hereinafter with reference to FIGS. 8 and 9A–9F. The circuit configuration of the digital image reproducing apparatus implementing the third embodiment may be the same as that shown in FIG. 4. In other words, the program stored in the ROM of the CPU 120 is changed to the menu-driven software according the third embodiment.

Figure 8:
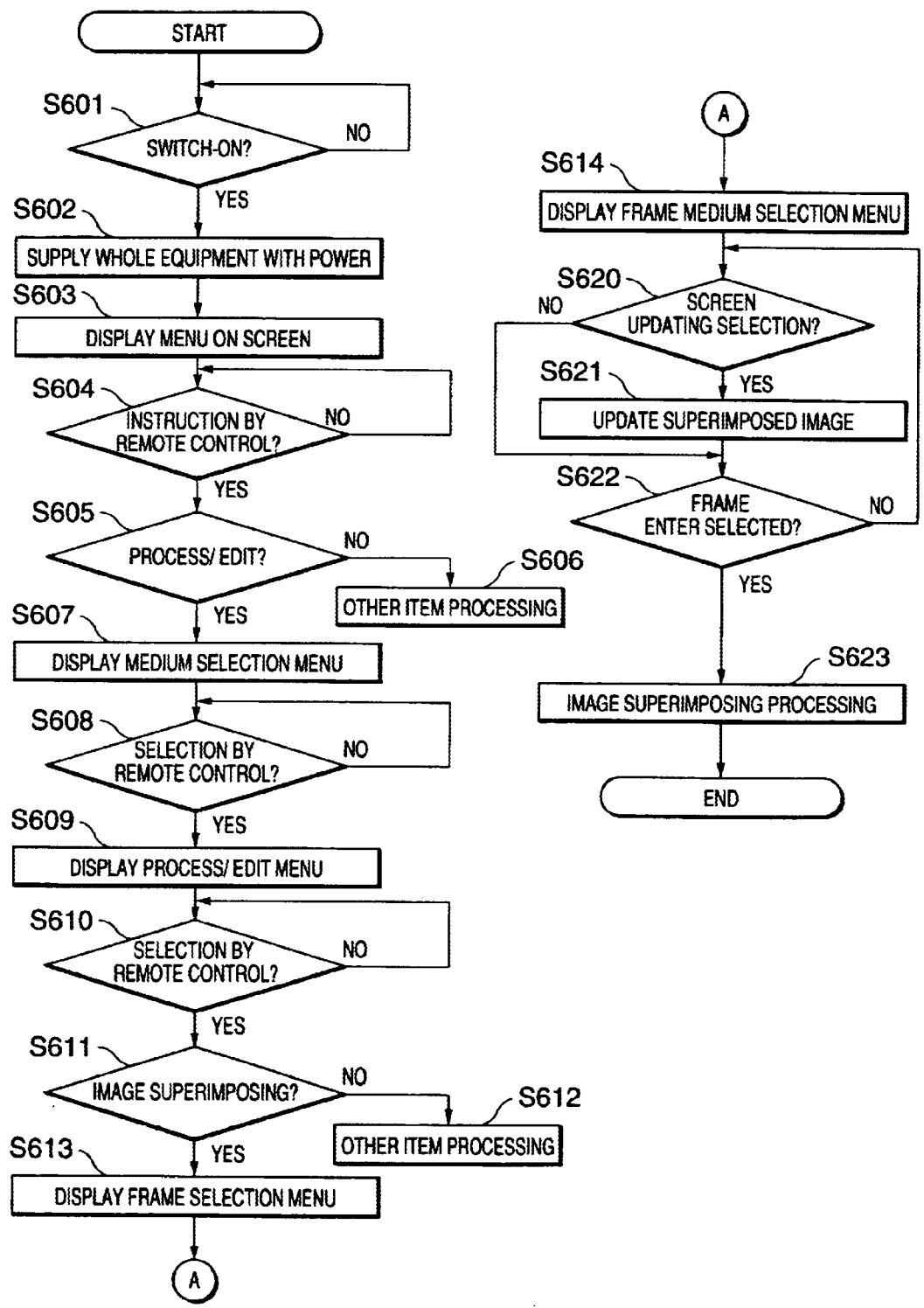
FIG. 8 is a flowchart showing an operation of a digital image reproducing apparatus according to a third embodiment of the present invention.

Referring to FIG. 8, when the power-supply switch 101 has been turned on or when there has been dispatched a command for turning on the power supply from the remote control unit 107 (YES in step S601), the CPU 120 turns on the switch 134 and thereby power is supplied to the whole apparatus (step S602). Then, the CPU 120 starts up the digital image reproducing program according to the second embodiment.

First, a menu is displayed on screen as shown in FIG. 7A on the display 129 (step S603). More specifically, the CPU 120 changes over the video signal selector 206 to select an analog RGB signal from the RGB signal processor 209, and outputs menu screen data stored in the ROM to the digital RGB signal processor 210.

When the user moves a cursor (a highlighted frame in the example of FIGS. 9A–9F) to select a desired processing item "Process/edit" with a predetermined key on the remote control unit 107 and presses the enter key, the "Process/edit" processing indicated by the cursor is started. Accordingly, if the user has selected a processing item other than "Process/edit" by the remote control operation, the other processing is carried out (YES in step S604, NO in step S605 and S606).

Figure 9A:
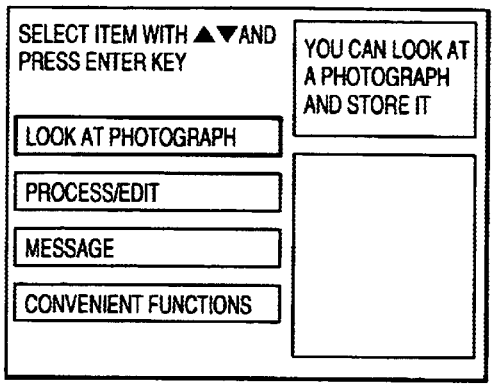
FIGS. 9A–9F are an explanatory diagram for showing a menu screen in the third embodiment.
Figure 9B:
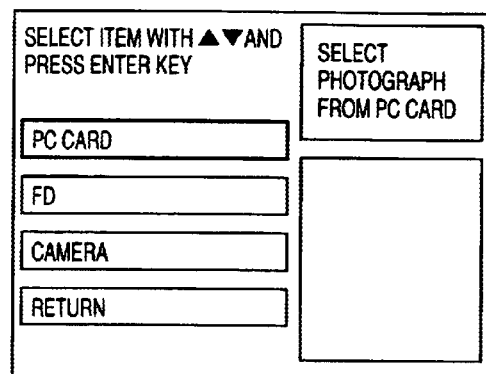
Figure 9C:
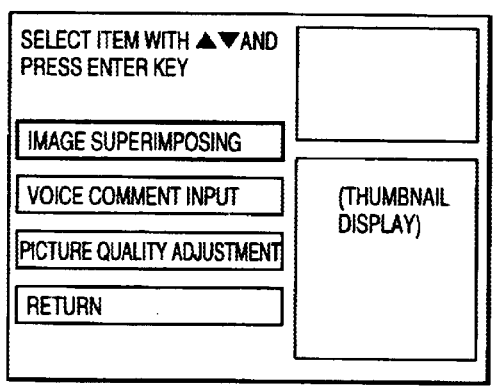

When "Process/edit" has been selected in the menu screen as shown in FIG. 9A, the CPU 120 controls the RGB signal processor 209 so that a medium selection menu is displayed on screen as shown in FIG. 9B (step S607). When the user has pressed the enter key of the remote control unit 107 with the cursor pointing to a desired medium, the CPU 120 displays a processing selection menu on screen as shown in FIG. 9C (YES in step S608 and S609). In the process/edit menu as shown in FIG. 9C, a plurality of images in each image data file included in the selected external storage medium are displayed in reduced form in the thumbnail-display window. The user can select any one of the images by remote control operation.

In the process/edit menu screen as shown in FIG. 9C, when a processing has been selected by remote control operation (step S610), a menu screen of the corresponding processing is displayed, and this processing is carried out. In this case, it is assumed that "Image superimposing" has been selected (YES in step S611). "Image superimposing" is a processing item for superimposing an image of the digital still camera 100 taken in from the external storage medium or through the serial interface with a predetermined stored image (here, a frame image).

Figure 9D:
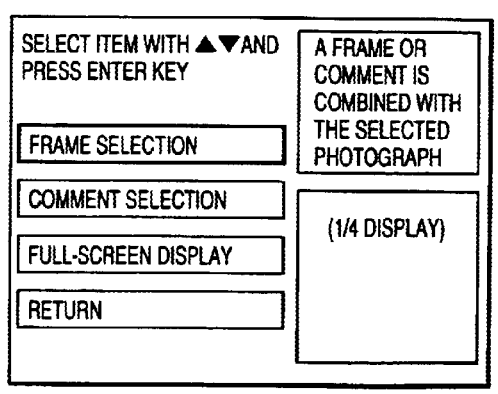
Figure 9E:
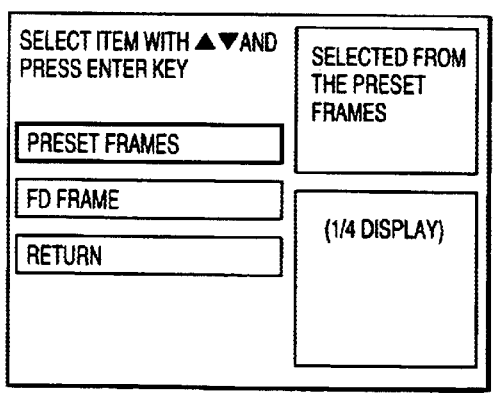

When "Image superimposing" has been selected, a frame selection menu is displayed on screen as shown in FIG. 9D (step S613). The image data selected in the menu of FIG. 9C is displayed on screen in a 1/4 size, for example. The user selects a frame or a comment to be combined with the selected image by remote control operation. In this case, if the user has selected "Frame selection" for selecting a frame image, a frame medium selection menu is displayed on screen as shown in FIG. 9E (step S614).

Figure 9F:
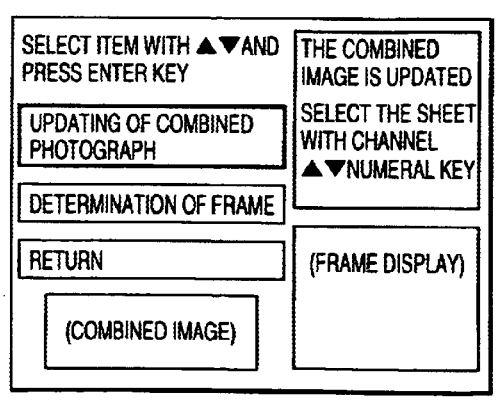

In the frame medium selection menu screen, "Preset frames" means each frame image stored in the ROM or the like of the CPU 120. "FD frame" means each frame image stored in the FD. A frame image is, for example, an image of a decoration frame or a specified personal image. In the frame medium selection menu screen, image data selected in the menu of FIG. 9C is also displayed. When "Preset frames" or "FD frame" has been selected and the enter key on the remote control unit 107 has been pressed, an image superimposing menu is displayed on screen as shown in FIG. 9F.

In the image superimposing menu screen, the first frame image in the selected storage medium is displayed in a 1/4 size, for example. The CPU 120 combines the selected image data on the menu screen with the currently selected frame image in the storage medium to produce the superimposed image data, which is displayed on a part of the screen, if this superimposed image is not a user's desired one, the user can select a next frame image by remote control operation. When a frame image has been changed (step S620), the next frame image stored in the selected storage medium is displayed on screen, and the image data is combined with a currently selected frame image in the storage medium and the superimposed image data is displayed on screen (step S621).

When the user has selected "Determination of Frame" by remote control operation (step S622), the CPU 120 makes a file of the displayed superimposed image and stores it onto the external storage medium (step S623).

In the above operation, it is possible to obtain a combined image of the image of the digital still camera 100 input from the external storage medium or through the serial interface with a predetermined frame image. In the process of obtaining a combined image, the user can carry out all operations through the remote control unit 107. Therefore, according to the present embodiment, a combined or superimposed image can be obtained by a simple user interface.

It is also possible to print a combined image. In this case, a combined image is selected in the menu as shown in FIG. 9F, for example, and a print key on the remote control unit 107 is pressed. Then, the CPU 10 transfers the data of the currently selected combined image to the printer controller 215.

FOURTH EMBODIMENT

Figure 10:
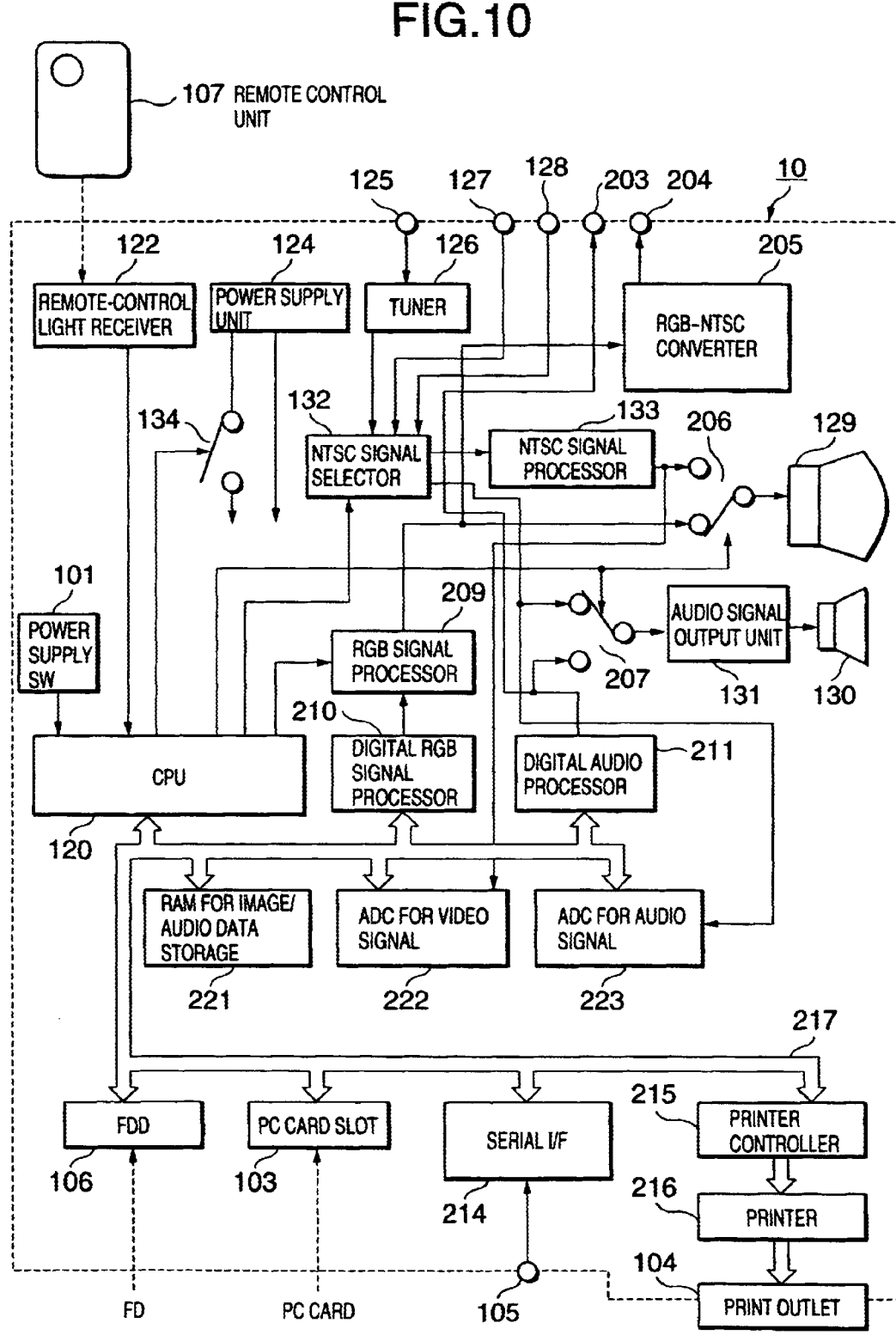
FIG. 10 is a block diagram showing the internal circuit of a digital image reproducing apparatus according to a fourth embodiment of the present invention.

In FIG. 10, there is shown a fourth embodiment of the digital image reproducing apparatus, where circuit blocks similar to those previously described with reference to FIG. 4 are denoted by the same reference numerals and the descriptions thereof are omitted.

As shown in FIG. 10, an image/audio data storing RAM 221 for storing image and audio data, a video signal analog-to-digital converter ADC 222 for converting a video signal into digital image data, and an audio signal A/D converter 223 for converting an audio signal to a digital audio signal are added to the circuit of FIG. 4. The video signal A/D converter 222 is connected to the bus line 217, and an image signal from the NTSC signal processor 133 is output to the video signal A/D converter 222. The audio signal A/D converter 223 is also connected to the bus line 217, and an audio signal from the NTSC signal selector 132 is output to the audio signal A/D converter 223.

Figure 11:
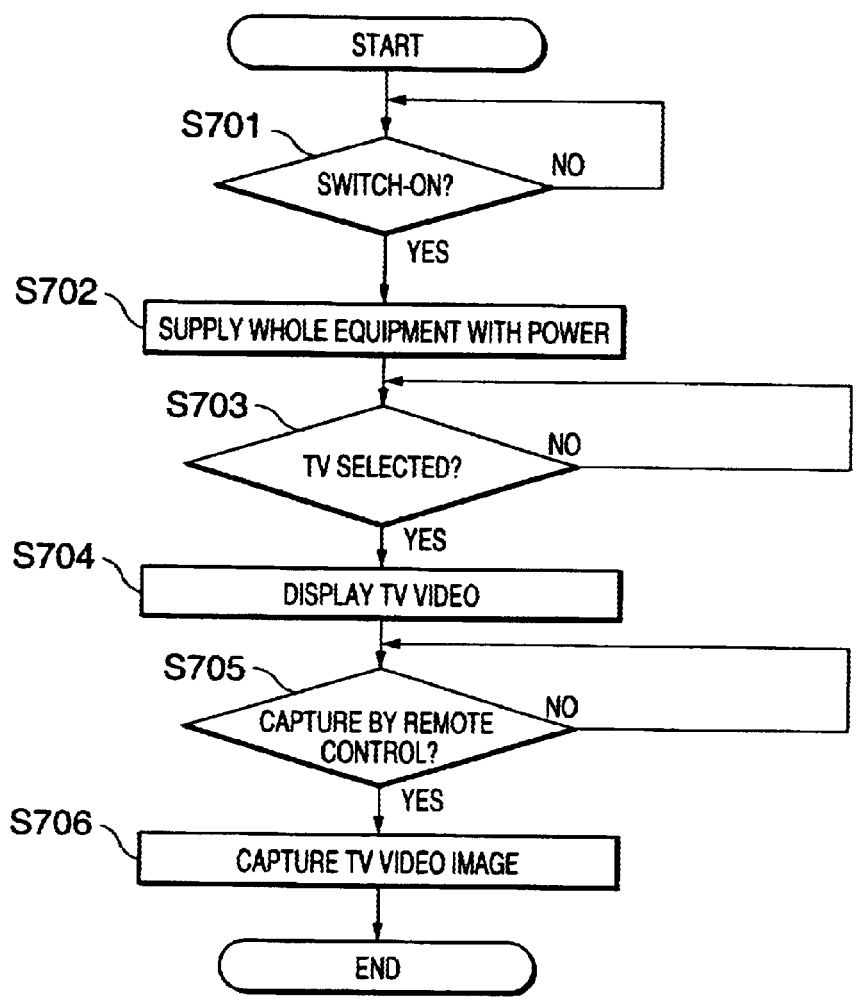
FIG. 11 is a flowchart showing an operation of the fourth embodiment.

Referring to FIG. 11, only steps different from those of the first embodiment will be explained. The user turns on the power supply switch 101 and power is supplied to all the circuit blocks of the digital image reproducing apparatus 10 (steps S701 and S702). Then, the user selects the television mode by the remote control unit 107 (step S703). When the user is watching the television (step S704), the user transmits a command of "Television image capture execution" from the remote control unit 107. The CPU 120 receives this command through the remote-control light receiver 122 (step S705). Then, the CPU 120 executes the processing for taking in a television image (step S706).

More specifically, the CPU 120 instructs the video signal A/D converter 222 to take in a one-frame video signal from the NTSC signal processor 133 and to convert this video signal into digital image data. Based on this instruction, the video signal A/D converter 222 takes in and converts the one-frame video signal into digital image data and stores the digital image data onto the image/audio data storing RAM 221.

Then, the CPU 120 instructs the audio signal A/D converter 223 to take in an audio signal for a certain constant period from the NTSC signal selector 132 and to convert this signal into digital form. Based on this instruction, the audio signal A/D converter 223 takes in the audio signal from the NTSC signal selector 132 and converts this signal into digital audio data and stores the digital audio data onto the image/audio data storing RAM 221.

In this case, the CPU 120 may associate the image data with the audio data. In other words, the CPU 120 may assign the same file name to an image data file including the image data and an audio data file including the audio data but different identifiers. With this arrangement, if a plurality of data items are stored in the image/audio data storing RAM 221, it becomes easy to associate image data with audio data.

Figure 12:
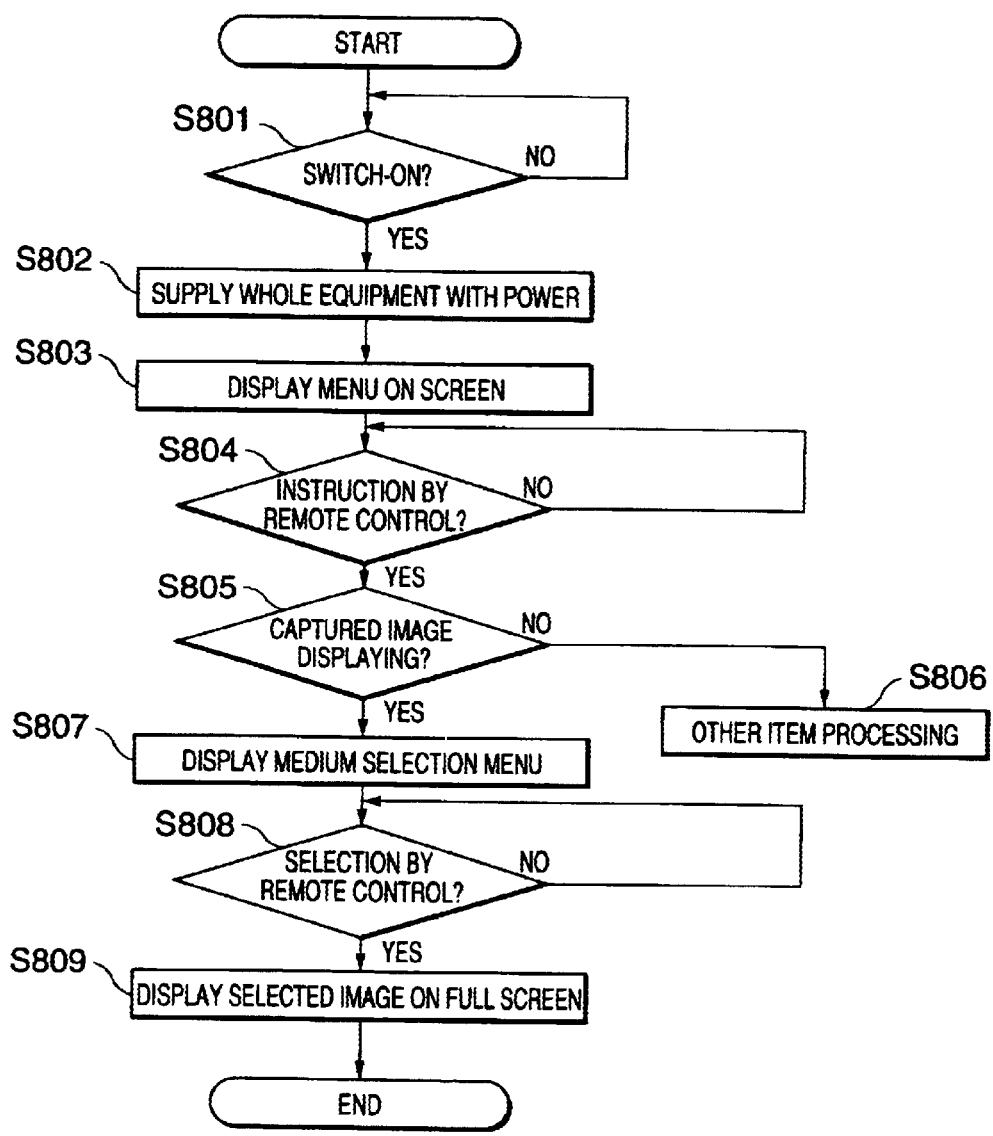
FIG. 12 is a flowchart showing image processing in the fourth embodiment.

Referring to FIG. 12, when power has been supplied to the whole apparatus (steps S801 and S802), the CPU 120 displays the menu screen (step S803). On this menu screen, it is further possible to select "Capture image output". When "Capture image output" has been selected by the remote control unit 107 (steps S804 and S805), the image selection menu screen is displayed (step S807). When a menu item other than "Capture image output" is selected, the corresponding processing is carried out (step S806).

Further, the CPU 120 changes over the video signal selector 206 to select an analog RGB signal from the RGB signal processor 209, and changes over the audio signal selector 207 to select an audio signal from the digital audio signal processor 211.

On the image selection menu screen, the CPU 120 outputs digital data of each image stored in the image/audio data storing RAM 221 to the digital RGB signal processor 210. Accordingly, the image already stored by the operation as described before is displayed in reduced form on screen of the display 129. When the user has selected an image by remote control operation (step S808), the CPU 120 performs processing of a full-screen display of the selected image on the display 129 (step S809). At the same time, the CPU 120 outputs the audio data of an audio data file relevant to the file of the selected image to the digital audio signal processor 211. Accordingly, the audio data in the audio data file is converted into sound waves by the speaker 130.

The output of the RGB signal processor 209 is also supplied to the RGB-NTSC converter 205. Since an video signal from the RGB-NTSC converter 205 is output to the video output terminal 204, it is also possible to output the video signal to the video printer or the like connected to the video output terminal 204. In other words, it is also possible to output the captured television image to the external apparatus such as a video printer or the like.

Figure 13:
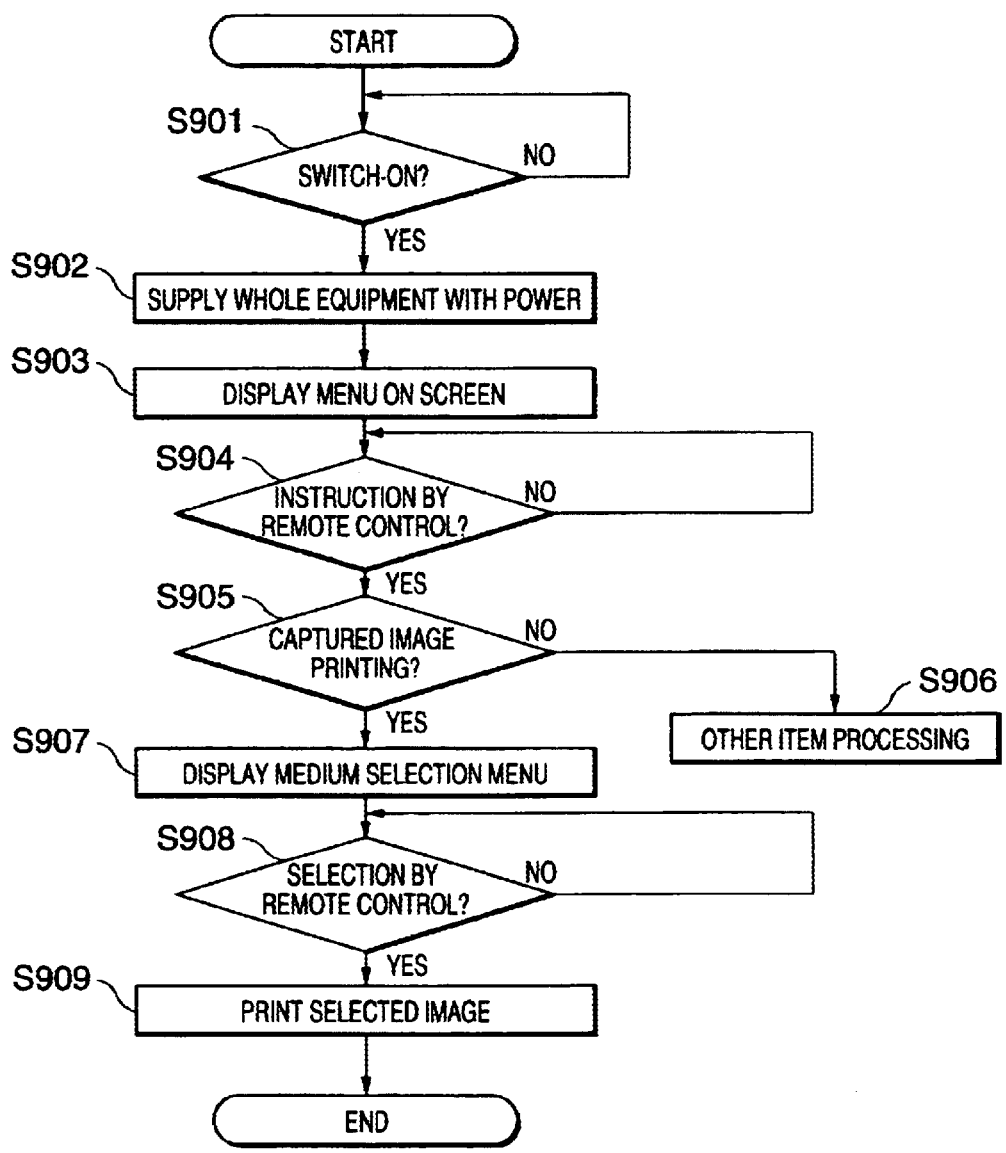
FIG. 13 is a flowchart showing image printing processing in the fourth embodiment.

Referring to FIG. 13, when power has been supplied to the whole apparatus (steps S901 and S902), the CPU 120 displays the menu screen (step S903). On this menu screen, it is possible to select "Capture image printinging". When "Capture image printinging" has been selected by the remote control unit 107 (steps S904 and S905), the image selection menu screen is displayed (step S907). When a menu item other than "Capture image printing" is selected, the corresponding processing is carried out (step S906).

On the image selection menu screen, the CPU 120 outputs digital data of each image stored in the image/audio data storing RAM 221 to the digital RGB signal processor 210. Accordingly, the image already stored by the operation as described before is displayed in reduced form on screen of the display 129. When the user has selected an image by remote control operation (step S908), the CPU 120 transfers the data of the selected image to the printer controller 215. As a result, the select image is printed and output by the print processing explained previously (step S909).

As described above, according to the fourth embodiment, it is possible to display the captured television image on screen as well as to produce a print thereof. Alternatively, the image data can also be transferred to the printer controller 215 by pressing the print key on the remote control unit 107 while the processing of "Capture image output" is being carried out. In this case, the menu item of "Capture image printing" is not needed.

Further, is the item of "Capture image storing" is prepared on the menu screen in advance, it is also possible to store the image and audio data stored in the image/audio data storing RAM 221 onto the external storage medium such as an FD or the like depending on the user's selection of "Capture image storing".

If the image/audio data storing RAM 221 is a non-volatile memory, the processings of "Capture image output", "Capture image printing" and "Capture image storing" can be executed after the image has been captured (even after the power supply has been turned off). In the case where the image/audio data storing RAM 221 is not a non-volatile memory, the processings of "Capture image output", "Capture image printing" and "Capture image storing" can be executed after the image has been captured and before the power supply has been turned off.

In the fourth embodiment, it has been explained that an image data file including image data and an audio data file including audio data are associated with each other to have the same file name but with different identifiers. However, they can be associated with each other by another method. It may also be arranged such that the files of audio data and the files of image data are managed separately, and the "Capture sound output" and "Capture sound storing" items are prepared on the menu screen so that the audio signal is output to the speaker or is stored in the FD in response to the respective instructions.

FIFTH EMBODIMENT

Figure 14:
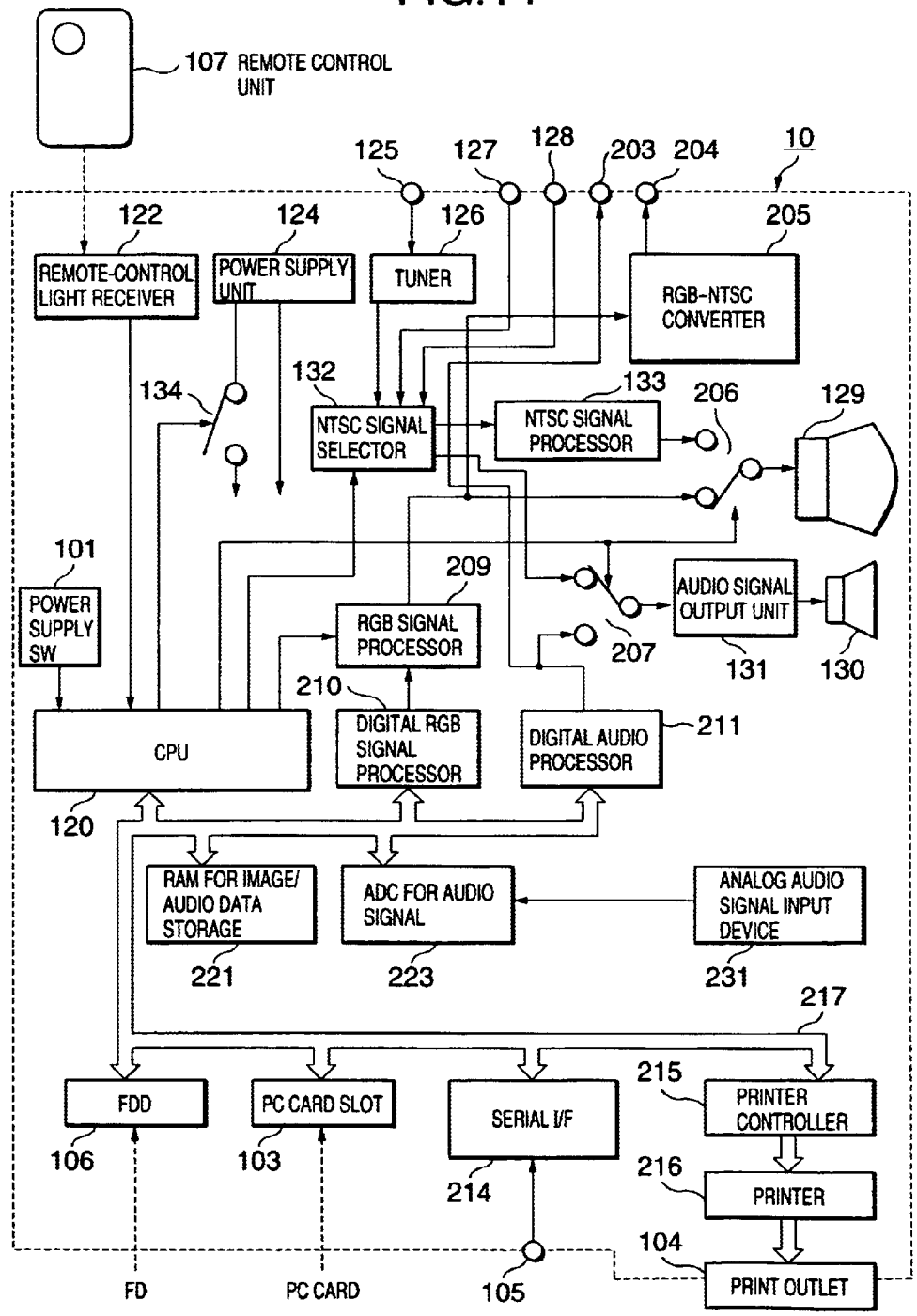
FIG. 14 is a block diagram showing the internal circuit of a digital image reproducing apparatus according to a fifth embodiment of the present invention.

In FIG. 14, there is shown a fifth embodiment of the digital image reproducing apparatus, where circuit blocks similar to those previously described with reference to FIG. 4 are denoted by the same reference numerals and the descriptions thereof are omitted.

Referring to FIG. 14, an image/audio data storing RAM 221 for storing image and audio data, an audio signal A/D converter 223 for converting an audio signal into digital form, and an analog audio signal input device 231 for converting sound waves to input audio signals are added to the circuit of FIG. 4. The analog audio signal input device 231 may be a microphone. The input audio signal is output to the audio signal A/D converter 223.

Only the operation different from that of the first embodiment will be explained. When the user has dispatched a command of "Message voice recording" using the remote control unit 107, the CPU 120 receives this command through the remote control light receiver 122. Then, the CPU 120 sets the digital image reproducing apparatus 10 to a message voice recording waiting state. When a command of "Message voice recording execution" has been dispatched from the remote control unit 107 in this state, the audio signal generated by the analog audio signal input device 231 is converted into digital form by the audio signal A/D convertor 223, and the digital audio data is stored onto the image/audio data storing RAM 221.

When the user has dispatched a command of "Message reproduction" by the remote control unit 107, the CPU 120 receives this command through the remote-control light receiver 122. Then, the CPU 120 transfers the audio data stored in the image/audio data storing RAM 221 to the digital audio signal processor 211. The CPU 120 also changes over the audio signal selector 207 to select the audio signal from the digital audio signal processor 211. Accordingly, the audio data stored in the digital audio signal processor 211 is converted into an analog audio signal by the digital audio signal processor 211, and the audio signal is output as sound waves from the speaker 130. Thus, the digital image reproducing apparatus 10 can also be used as a message recording apparatus.

In the case of recording a message voice based on the command of "Message voice recording execution", the image of the digital still camera 100 input through the external storage medium like the PC card or the FD may be associated with the input audio data, and stored onto the image/audio data storing RAM 221. For example, the image data file including the image data and the audio data file including the audio data have the same file name with different identifiers. With this arrangement, the message voice and the associated image can be reproduced at the same time, so that a message receiver can recognize the message content securely.

SIXTH EMBODIMENT

The sixth embodiment using the menu-driven software will be described in detail hereinafter with reference to FIGS. 15 and 16A–16F. The circuit configuration of the digital image reproducing apparatus implementing the second embodiment may be the same as that shown in FIG. 14.

Figure 15:
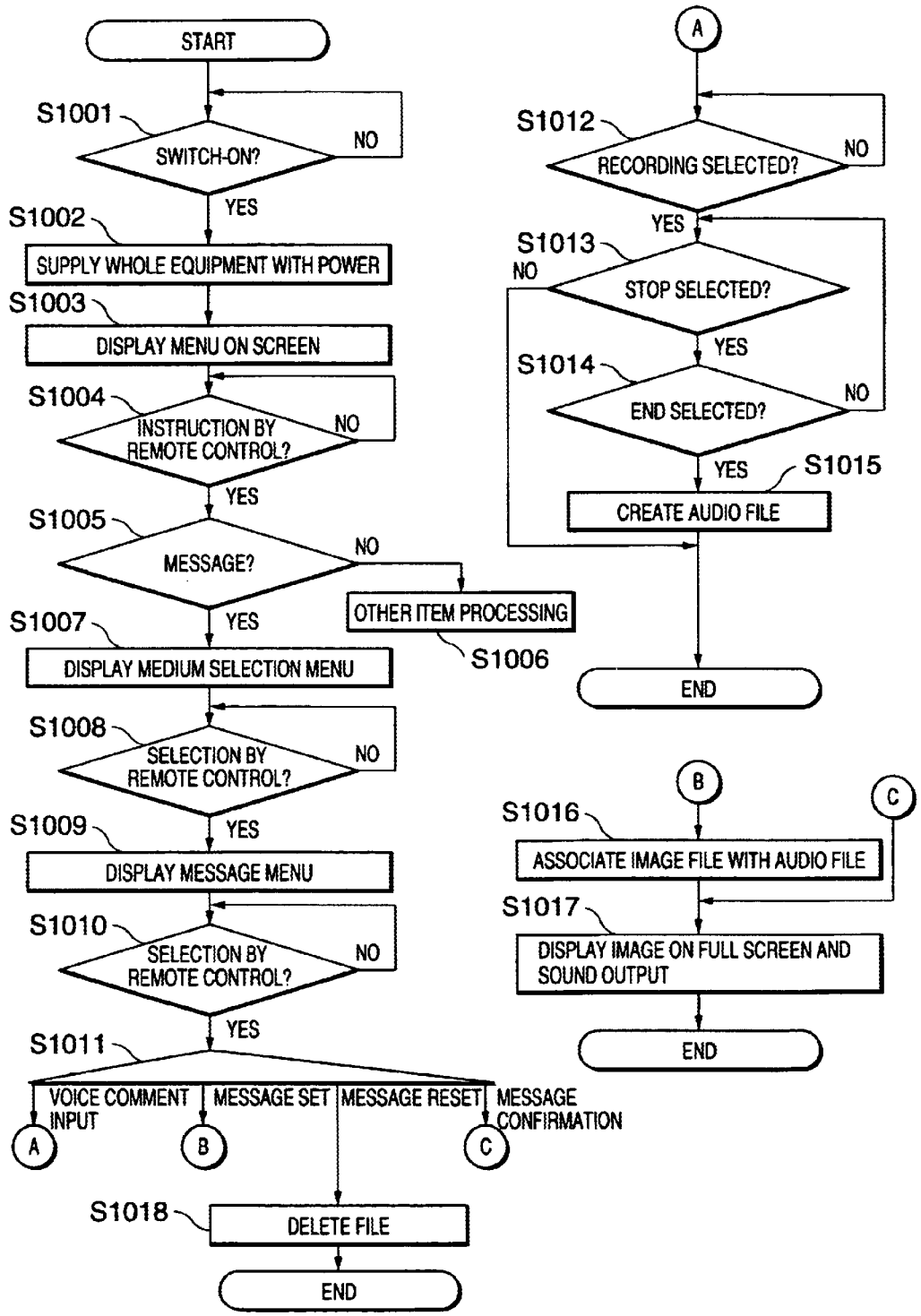
FIG. 15 is a flowchart showing an operation of a digital image reproducing apparatus according to a sixth embodiment of the present invention.
Figure 16A:
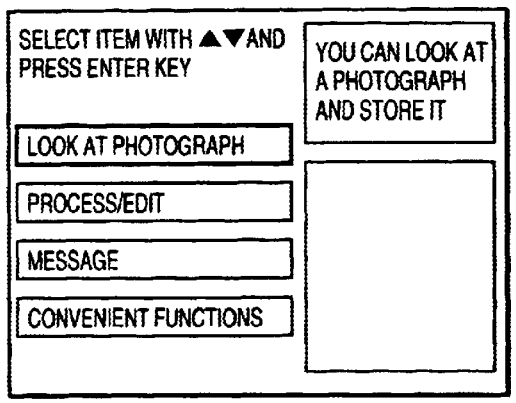
FIGS. 16A–16F are an explanatory diagram showing a menu screen in the sixth embodiment.

Referring to FIG. 15, when the user has turned on the power supply switch 101 and power is supplied to the digital image reproducing apparatus 10 (steps S1001 and S1002), the CPU 120 displays a menu screen as shown in FIG. 16A (step S1003). It is assumed, in this case, that the user has selected "Message" by remote control operation (steps S1004 and S1005). When the user has selected another item, the corresponding processing will be carried out (step S1006).

Figure 16B:
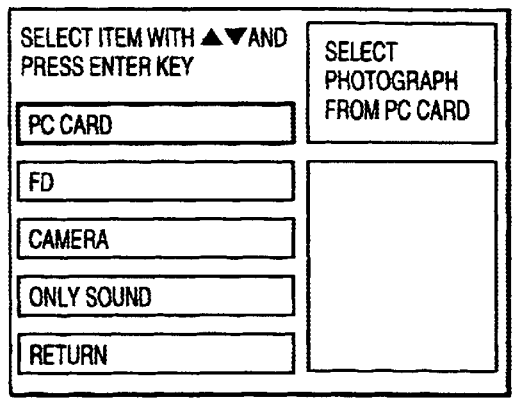

When "Message" has been selected, a medium selection menu is displayed on screen as shown in FIG. 16B (step S1007). When the user has pressed the enter key with pointing the cursor to a desired medium, a processing selection menu is displayed on screen as shown in FIG. 16C (steps S1008 and S1009).

Figure 16C:
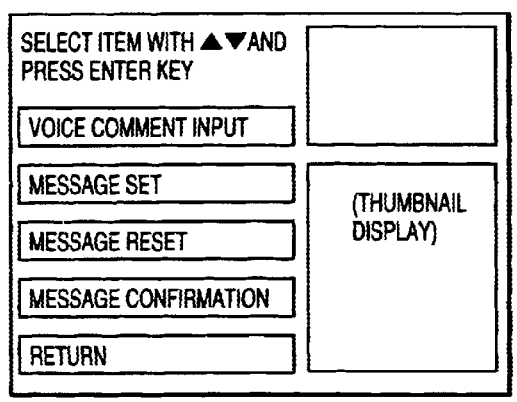

In the processing selection menu screen as shown in FIG. 16C, a plurality of images in each image data file of the selected external storage medium are displayed in reduced form in the window of a thumbnail display. Then, the user can select any one of the images by remote control operation.

Thereafter, the corresponding processing is executed depending on selection carried out in a remote control operation (steps S1010 and S1011).

Figure 16D:
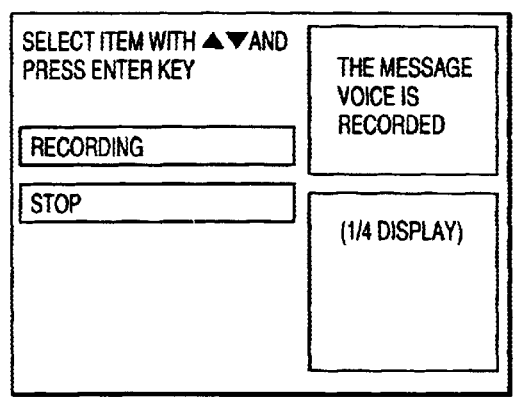
Figure 16E:
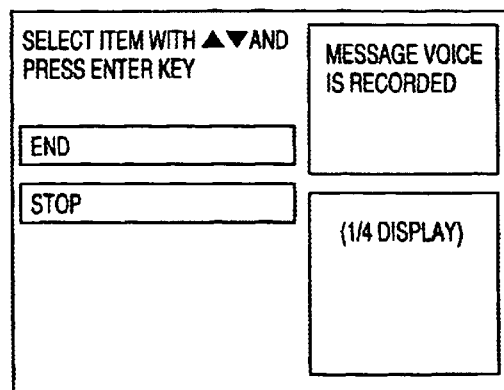

When "Voice comment input" has been selected on the processing selection menu screen (step S1011), a screen image as shown in FIG. 16D is displayed. On the screen shown in FIG. 16D, an image selected on the preceding screen is also displayed in a ¼ size, for example. When "Recording" has been selected by remote control operation (step S1012), the CPU 120 sets the image/audio data storing RAM 221 to a recordable state. In other words, when a screen image as shown in FIG. 16E has been displayed and when the user has input voice to the analog audio signal input device 231, the audio signal is converted into digital form by the audio signal A/D converter 223. Then, the CPU 120 stores the digital audio data onto the image/audio data storing RAM 221.

When "Stop" has been selected by remote control operation (step S1013), the CPU 120 stops the recording. When "End" has been selected by remote control operation (step S1014), the CPU 120 creates an audio data file containing recorded audio data (step S1015). The CPU 120 also stores the data of the image selected on the menu screen as shown in FIG. 16C onto the image/audio data storing RAM 221.

Figure 16F:
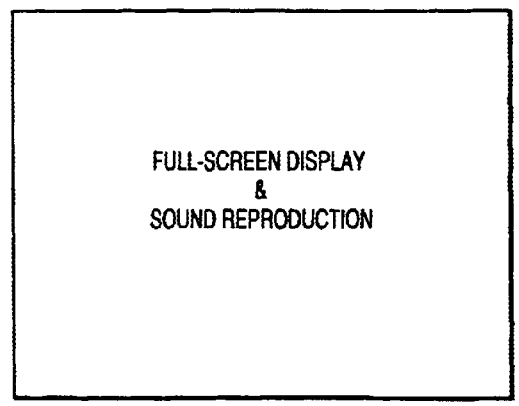

When "Message setting" has been selected on the processing selection menu screen (step S1011), the CPU 120 assigns to the audio data file of the recorded audio data the same file name as the file name of the image data file of the image selected on the menu screen as shown in FIG. 16C but with a different identifier (step S1016). A message including the audio and image data is set in this way. Then, the CPU 120 turns on a message light-emitting diode (LED) (not shown) provided in the digital image reproducing apparatus 10. With this message LED, a person who receives the message can easily know the presence of a message. Further, as shown in FIG. 16F, the message image is displayed on screen and the message voice is generated from the speaker 130 (step S1017).

In the above description, the audio data file and the image data file are associated with each other when "Message setting" has been selected. However, this may be set when "End" has been selected in the processing of "Voice comment input".

When "Message resetting" has been selected on the processing selection menu screen (step S1011), the CPU 120 deletes the message voice file and image data file (step S1018). When "Message confirmation" has been selected on the processing selection menu screen (step S1011), the CPU 120 carries out a processing for reproducing an audio signal from the set message voice file to output voice from the speaker 130, and a processing for reproducing the image from the image data file to display it on display 129 (step S1017).

As explained above, the image data picked up by the digital still camera 100 which is input through the external storage medium like the PC card and the FD can be associated with the input audio data, and these data can be stored as a single message. If the image/audio data storing RAM 221 is non-volatile memory, the user who inputs the message can go out with the digital image reproducing apparatus 10 powered off. In a state that the plug of the power supply cord of the digital image reproducing apparatus 10 is inserted into the wall outlet, a person who is to receive the message can recognize easily the presence of a message with the lighting of the message LED.

The person who is to receive the message turns on the power supply switch 101 and power is supplied to the digital image reproducing apparatus 10, and selects "Message confirmation" on the menu screen as shown in FIG. 16C, so that the receiver person can recognize the message in image and voice. Further, it may be so arranged that if the power supply to the digital image reproducing apparatus 10 has been turned off when there exists a message, the CPU 120 automatically reproduces the message when powered on.

SEVENTH EMBODIMENT

In FIG. 17, there is shown a seventh embodiment of the digital image reproducing apparatus, where circuit blocks similar to those previously described with reference to FIG. 4 are denoted by the same reference numerals and the descriptions thereof are omitted.

Referring to FIG. 17, an image/audio data storing RAM 221 for storing image and audio data, a video signal A/D converter 222 for converting a video signal into digital image data, an audio signal A/D converter 223 for converting an audio signal into digital form, an analog audio signal input device 231 for converting sound waves to input audio signals, and an audio signal input selector 232 for selecting one of the audio signal from the NTSC signal selector 132 and the audio signal from the analog audio signal input device 231 are added to the circuit of FIG. 4. The analog audio signal input device 231 may be a microphone.

In a manner similar to that in the fourth embodiment, when the user dispatches a signal for commanding "Television image capture execution" from the remote control unit 107 in a state of watching on a television, the CPU 120 receives this command through the remote-control light receiver 122. Then, the CPU 120 executes the processing for taking in a television video signal.

More specifically, the CPU 120 instructs the video signal A/D converter 222 to take in a one-frame video signal from the NTSC signal processor 133 and to convert it into digital image data. Based on this instruction, the image signal A/D converter 222 takes in the one-frame image signal and converts it into digital image data and stores the result onto the image/audio data storing RAM 221.

Further, the CPU 120 sets the audio signal input selector 232 to select the audio signal from the NTSC signal selector 132 to output it to the audio signal A/D converter 223. Then, the CPU 120 instructs the audio signal A/D converter 223 to take in an audio signal for a certain period from the NTSC signal selector 132 and to convert this signal into digital form. Based on this instruction, the audio signal A/D converter 223 take in the audio signal from the NTSC signal selector 132 and converts this signal into digital form, and stores the result onto the image/audio data storing RAM 221. In this case, the CPU 120 may associate the image data with the audio data. For example, an image data file including the image data and an audio data file including the audio data have the same file name with different identifiers.

In a manner similar to that in the fifth embodiment, when the user has dispatched a command of "Message voice recording" by the remote control unit 107, the CPU 120 receives this command through the remote-control light receiver 122. Then, the CPU 120 sets the digital image reproducing apparatus 10 to a message voice recording waiting state. When a command or "Message voice recording execution" has been dispatched from the remote control unit 107 in this state, the audio signal input selector 232 is set to output the audio signal from the analog audio signal input device 231 to the A/D converter 223. Then, the audio signal input by the user through the analog audio signal input device 231 is converted into digital form by the audio signal A/D converter 223, and this data is stored onto the image/audio data storing RAM 221.

In this case, an audio data file including a recorded message voice and a file including an image of the digital still camera 10 that can be taken in from the PC card or the FD may be associated with each other, and stored onto the image/audio data storing RAM 221 in a manner similar to that in the sixth embodiment.

When the user has dispatched a command of "Message reproduction" by the remote control unit 107, the CPU 120 receives this command through the remote-control light receiver 122. Then, the CPU 120 transfers the audio data stored in the image/audio data storing RAM 221 to the digital audio signal processor 211. Further, the CPU 120 changes over the audio signal selector 207 to select the audio signal from the digital audio signal processor 211. Accordingly, the audio data stored in the image/audio data storing RAM 221 is converted into an analog audio signal by the digital audio signal processor 211, and the analog audio signal is output as sound waves from the speaker 130.

As explained above, the digital image reproducing apparatus 10 according to the seventh embodiment can be used as a television image capture apparatus and can also be used as a message recording apparatus.

When "Process/edit" has been selected in a remote control operation, the process/edit menu is displayed on screen, in a manner similar to that of the third embodiment. When "Image superimposing" has been selected, the CPU 120 combines a selected predetermined image (here, a frame image) with the image picked up by the digital still camera 100 which is input from the external storage medium or through the serial interface.

By the above-described processing, it is possible to obtain a superimposed image which is a combination of an original image picked up by the digital still camera 100 and the selected frame image.

Further, since a television captured image is stored in the image/audio data storing RAM 221, the CPU 120 can use an image data file including the television captured image when an audio data file including a recorded message voice is associated with an image data file. In other words, a captured image can be used as a message image.

Further, it is also possible to use a captured image as a frame image for superimposing images. In this case, "Capture image" can also be selected on the frame medium selection menu screen (see FIG. 9E) in combining the images. When the user has selected "Capture image" by remote control operation, the CPU 120 combines the television captured image stored in the image/audio data storing RAM 221 with the already-selected image data to be combined.

Further, since the audio signal from the NTSC signal selector 132 has already been stored as an audio data file in the image/audio storing RAM 221, it is possible to handle the audio signal taken in from a television video signal in a manner similar to that for handling the audio signal recorded by the digital still camera 100.

As described above, according to the present invention, the digital image reproducing apparatus is structured to include a reproducing unit for reproducing image data of a digital still camera into a displayable image and a display unit for making a visual display of an image based on an image output from the reproducing unit. Therefore, this apparatus does not require a personal computer for reproducing image data, and there is an effect that it is easy to secure a place for installing the apparatus for making an image reproduction. Further, for making an image display, a complex wiring is not required and it is not necessary to turn on power supply to a plurality of units. Moreover, since the reproducing unit and the display unit are consolidated, an image can be produced by a standardized operating unit such as a remote control unit or the like.

Further, according to the present invention, a ROM can be used as the reproducing unit. In this case, as the reproducing unit is started in a short time, it takes a shorter time from the starting of the apparatus to the starting of the reproduction as compared with the time required by the conventional system. Accordingly, this has an effect that a comfortable reproduction environment can be provided to the user.

If the apparatus further includes a printing unit for making a print output of an image based on the image output from the reproducing unit, it is not necessary to prepare a separate printer or a video printer for making a print out. This has an effect that it is easy to secure a place for setting the apparatus for making an image print out. Further, for printing an image, a complex wiring is not required and it is not necessary to turn on power supply to a plurality of units. Moreover, since the printing unit is also consolidated, an image can be printed by a standardized operating unit such as a remote control unit or the like.

If the apparatus is so structured that the reproducing unit is started automatically upon turning on the power supply, a user operation is not necessary for reproducing an image and/or a sound. This has an effect that a general user can easily carry out a reproduction of the image and/or sound.

If a startup unit is so structured as to automatically turn on the power supply and to start the reproducing unit at the same time upon connection of the medium, an ordinary user can carry out the reproduction of the image and sound much easier.

Further, if a ROM is used for the reproducing unit, the reproducing unit can be started in a short time after the power supply to the apparatus has been turned on. Accordingly, a much more comfortable environment can be offered to the user.

If the digital image reproducing apparatus has a structure including a storage unit for storing image data and/or audio data, there is an effect that it is easy to constantly store the image data and audio data of the digital still camera. Further, it is also possible to obtain an apparatus that can utilize the stored data for a message or the like.

When there are special image data and/or audio data stored in the storage unit, and if the reproducing unit is so structured as to automatically reproduce such data upon turning on the power supply, a stored message can be reproduced automatically when the power is supplied to the apparatus.

If the digital image reproducing apparatus is so structured as to combine an image restored by the reproducing unit with an image stored in advance, it is possible to decorate the image picked up by the digital still camera or to combine this image with another image of other person, for example.

If the apparatus includes an associating unit for associating the image data with the audio data at the time of storing these data, there is an effect that at the time of reproducing the image, the associated audio data can be retrieved easily for making sound reproduction.

In associating the data, if the apparatus is so structured that the image data file including the image data and the audio data file including the audio data have the same file name with different identifiers, the image and audio can be associated with each other much easier.

If the digital image reproducing apparatus includes a capturing unit for taking in and storing television video image and/or television video sound, it is possible to utilize he image and sound taken in from a television video signal for producing a message or for image superimposing.

If the apparatus includes a capture image associating unit for associating a television video image stored by the capturing unit with an input sound and storing the associated image and sound, it is easy to prepare a message using the input sound and the television video image.

If the apparatus is so structured as to reproduce an image and a sound from image data and audio data stored by the capture image associating unit, there is an effect that a message utilizing the television image can be reproduced automatically.

If the apparatus includes a capture image composing unit for combining a television video image stored by the capturing unit with an image reproduced by the reproducing unit, it is possible to decorate the image picked up with the digital still camera with the television video image or to combine the two images for combining persons into one photograph, for example.

Further, according to the present invention, the digital image reproducing apparatus has a structure including an image change-over unit (or image signal selector) and an audio change over unit (or audio signal selector), wherein the image change-over unit converts an RGB signal inputted from a converter for converting image data from a camera data input unit into an RGB signal and an image signal from a television signal input unit and displays the changed-over signal in a display unit. The audio change-over unit changes over an audio signal from a audio signal converter for converting audio data from the camera data input unit into an audio signal with an audio signal from the television signal input unit and outputs the converted result to an audio output unit. Therefore, it is possible to obtain an apparatus capable of reproducing a television image and sound and also capable of easily reproducing image data and audio data of the digital still camera. Further, a complex wiring is not required for making an image display, and it is not necessary to carry out power supply to a plurality of units. Moreover, an image can be restored by a standardized operating unit such as a remote control unit or the like.

If the digital image reproducing apparatus further includes a printing unit for printing an image based on input image data, it is not necessary to prepare a separate printer or a video printer for making a print out. This has an effect that it is easy to secure a place for setting the apparatus for making an image print out. Further, for printing an image, a complex wiring is not required and it is not necessary to turn on power supply to a plurality of units. Moreover, since the printing unit is also consolidated, an image can be printed by a standardized operating unit such as a remote control unit or the like.

If the apparatus is structured to further include an image signal A/D converter for converting an image signal into digital image data, an audio signal A/D converter for converting an audio signal from the television signal input unit into digital audio data, and a memory unit for storing the digital image data and/or the digital audio data, there is an effect that the television image and the television audio can be applied to the preparation of an image superimposing.

If the apparatus is structured to include an audio signal input unit for taking in an externally input sound, an audio signal A/D converter for converting an audio signal from an audio signal input unit into digital audio data, and a memory unit for storing image data from a camera data input unit and the audio data from the audio signal A/D converter, there is an effect that the audio from the audio signal input unit can be associated with the image from the digital still camera and the associated result can be used for a message.

If the apparatus is structured to further include an audio input unit for taking in an externally input sound, and an input audio change-over unit for changing over an audio signal from a television signal input unit and an audio signal from the audio signal input unit and outputting a result to an audio signal A/D converter, there is an effect that the audio from the audio signal input unit can be associated with the image from the digital still camera and the associated result can be used for a message. There is also an effect that the television image and the television audio can be applied to an image superimposing or a message preparation.

Further, according to the present invention, there is provided a menu screen display or a hierarchical structure for enabling a user to select an image reproduction, an image processing, a message setting and a message confirmation, and the processing is executed based on the user's selected menu. Thus, there is an effect that the image reproduction, image processing/editing, message setting and message confirmation by the digital still camera can be achieved by an easy user interface.

Further, according to the present invention, the recording medium has a structure to include an image reproducing program for starting an image reproduction processing, an image processing, or a message setting processing or a message confirmation processing based on a user selection. Therefore, it is possible to provide by an easy user interface an environment for achieving the image reproduction, image processing/editing, message setting and message confirmation by the digital still camera.

If the image reproducing program is structured to carry out a print output of a restored image based on a user's assignment, it is also possible to achieve a print processing by an easy user interface.

What is claimed is:

1. An apparatus for reproducing at least an image picked up by a digital still camera, comprising:
   a housing;
   an input interface disposed in said housing that inputs recorded data of the digital still camera, the recorded data including at least image data;
   a converter disposed in said housing and coupled to said input interface that converts the recorded data into reproduced data;
   a user interface disposed in said housing and coupled to said converter that produces a recognizable output based on the reproduced data; and
   a controller disposed in said housing and coupled to said input interface, said converter, and said user interface, said controller controlling said input interface, said converter, and said user interface.

2. The apparatus according to claim 1, wherein the recorded data includes at least one of image data and audio data.

3. The apparatus according to claim 2, wherein the user interface comprises a display for displaying a visible image on screen as the recognizable output.

4. The apparatus according to claim 3, wherein the user interface further comprises a printer for printing a visible image on a medium as the recognizable output.

5. The apparatus according to claim 3, wherein the user interface further comprises an audio speaker for outputting a sound as the recognizable output.

6. The apparatus according to claim 1, further comprising:
   a power supply disposed in said housing and coupled to said controller, said controller further controlling said power supply; and
   a data medium connectable to said input interface, wherein the data medium is used to provide said recorded data to said input interface.

7. The apparatus according to claim 6, wherein when the power supply is turned on, the input interface inputs the recorded data from the data medium and the converter is activated to convert the recorded data to the reproduced data under control of the controller.

8. The apparatus according to claim 6, wherein when the data medium is connected to the input interface, the power supply is turns on and the converter is activated to convert the recorded data to the reproduced data under control of the controller.

9. The apparatus according to claim 6, further comprising:
   an image combiner disposed in said housing and coupled to said controller, said image combiner combining reproduced image data with preset image data to produce combined image data, wherein said user interface produces a recognizable image from said combined image data.

10. The apparatus according to claim 6, wherein the data medium is one of a data storing medium and a data transfer medium.

11. The apparatus according to claim 1, further comprising:
    a power supply;
    a data medium connectable to the input interface, wherein the data medium is used to provide the recorded data to the input interface;
    a memory for storing the recorded data inputted through the input interface; and
    a controller controlling the input interface, the converter, the user interface, the memory, and the power supply.

12. The apparatus according to claim 11, wherein when the power supply is turned on, the input interface inputs the recorded data from the data medium and the converter is activated to convert the recorded data to the reproduced data under control of the controller.

13. The apparatus according to claim 11, wherein when the data medium is connected to the input interface, the power supply is turned on and the converter is activated to convert the recorded data to the reproduced data under control of the controller.

14. The apparatus according to claim 11, wherein when the memory stores the recorded data, the power supply is turns on and thereby the converter is activated to convert the recorded data to the reproduced data under control of the controller.

15. The apparatus according to claim 11, wherein when the recorded data includes both image data and audio data, the recorded data is stored onto the memory such that the image data is associated with the audio data.

16. The apparatus according to claim 15, wherein an image data file including the image data and an audio data file including the audio data have the same file name but different identifiers.

17. The apparatus according to claim 11, further comprising:
    an image combiner for combining reproduced image data with preset image data to produce combined image data,
    wherein the user interface produces a recognizable image from the combined image data.

18. The apparatus according to claim 1, further comprising:
    a video capture circuit for capturing at least one of video image data and video audio data to store captured data; and
    a selector for selecting one of the recorded data and the captured data,
    wherein the converter converts selected data into reproduced data.

19. The apparatus according to claim 18, wherein when the captured data includes both video image data and video audio data, the captured data is stored such that the video image data is associated with the video audio data.

20. The apparatus according to claim 19, wherein an image data file including the video image data and an audio data file including the video audio data have the same file name but different identifiers.

21. The apparatus according to claim 18, further comprising:
    an image combiner for combining reproduced image data with preset image data to produce combined image data,
    wherein the user interface produces a recognizable image from the combined image data.

22. The apparatus according to claim 1, further comprising:
    a sound input circuit for inputting a sound to produce input audio data;
    a memory for storing image data and/or audio data; and
    a controller controlling the input interface, the converter, the user interface, the memory, and the sound input circuit,
    wherein image data inputted through the input interface and the input audio data are stored onto the memory such that the image data is associated with the input audio data.

23. The apparatus according to claim 22, further comprising:
    a video capture circuit for capturing at least one of video image data and video audio data to store captured data;
    a first selector for selecting one of recorded image data and captured video image data; and
    a second selector for selecting one of the input audio data and the captured video audio data,
    wherein selected image data and selected audio data are stored onto the memory such that the selected image data is associated with the selected audio data.

24. A digital image reproducing apparatus comprising:
    a housing;
    an input interface disposed in said housing, said input interface inputting data recorded by a digital still camera, said recorded data including at least image data;
    a tuner disposed in said housing, said tuner receiving a video signal of a selected channel;
    a converter disposed in said housing, said converter converting said recorded data into a reproduced signal;
    a first selector disposed in said housing, said selector selecting one of said video signal and said reproduced signal;
    a display disposed in said housing, said display displaying a visible image based on a signal selected by said first selector; and
    an audio output circuit disposed in said housing, said audio output circuit outputting a sound based on said selected signal.

25. The apparatus according to claim 24, further comprising:
    a video capture circuit disposed in said housing and connected to said tuner, said video capture circuit capturing at least one of video image data and video audio data to store captured data; and
    a second selector disposed in said housing, selecting one of said recorded data and said captured data;

wherein said converter converts data selected by said second selector into a reproduced signal.

26. The apparatus according to claim 25, wherein when the captured data includes both video image data and video audio data, the captured data is stored such that the video image data is associated with the video audio data.

27. The apparatus according to claim 26, wherein an image data file including the video image data and an audio data file including the video audio data have the same file name but different identifiers.

28. The apparatus according to claim 25, further comprising:

an image combiner disposed in said housing, combining a reproduced image signal with a preset image signal to produce a combined image signal, wherein said display produces a recognizable image from said combined image signal.

29. A method for reproducing an image and a sound, wherein the image is captured by a digital still camera, comprising the steps of:

displaying a menu having an image reproduction item, an image processing item, a message set item, and a message confirmation item, which are selectable;

reproducing the image inputted through a user's designated medium when the image reproduction item is selected;

processing the image when the image processing item is selected;

storing the image accompanied by the sound onto a memory when the message set item is selected; and reproducing the image and the sound stored in the memory when the message confirmation item is selected.

30. The method according to claim 29, further comprising the step of printing the image on a medium depending on a user's instruction.

31. A storage medium having an image reproducing program recorded thereon, the image reproducing program comprising the steps of:

displaying a menu having an image reproduction item, an image processing item, a message set item, and a message confirmation item, which are selectable;

reproducing the image inputted through a user's designated medium when the image reproduction item is selected;

processing the image when the image processing item is selected;

storing the image accompanied by the sound onto a memory when the message set item is selected; and reproducing the image and the sound stored in the memory when the message confirmation item is selected.

32. The storage medium according to claim 31, wherein the image reproducing program further comprises the step of printing the image on a medium depending on a user's instruction.

* * * * *